US012771484B2

(12) United States Patent
Wu

(10) Patent No.: US 12,771,484 B2
(45) Date of Patent: Oct. 20, 2026

(54) COMMUNICATION METHOD AND APPARATUS, DEVICE, CHIP, STORAGE MEDIUM, PRODUCT AND PROGRAM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 283 days.

(21) Appl. No.: 18/734,207

(22) Filed: Jun. 5, 2024

(65) Prior Publication Data

US 2024/0322950 A1 Sep. 26, 2024

Related U.S. Application Data

(63) Continuation of application No. PCT/CN2021/139287, filed on Dec. 17, 2021.

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1854* (2013.01); *H04W 72/1273* (2013.01); *H04W 72/232* (2023.01)

(58) Field of Classification Search
CPC ... H04L 1/1812; H04L 1/1854; H04L 1/1887; H04L 1/1896; H04L 1/1822;
(Continued)

(56) References Cited

U.S. PATENT DOCUMENTS

2022/0029733 A1* 1/2022 Ye ........................ H04B 7/1851
2022/0303065 A1* 9/2022 Hosseinian ........... H04L 1/1854
(Continued)

FOREIGN PATENT DOCUMENTS

WO 2021056313 A1 4/2021
WO 2021224733 A1 11/2021

OTHER PUBLICATIONS

International Search Report in the international application No. PCT/CN2021/139287, mailed on Jul. 29, 2022. 6 pages with English translation.

(Continued)

*Primary Examiner* — Yu-Wen Chang
(74) *Attorney, Agent, or Firm* — BAYES PLLC

(57) ABSTRACT

Provided are communication methods and apparatuses, devices, a chip, a storage medium, a product and a program. The method includes: a terminal device receives a first physical downlink shared channel (PDSCH) scheduled for a first hybrid automatic repeat request (HARQ) process from a network device; in a first time range, the terminal device is not expected to receive a second PDSCH scheduled for the first HARQ process from the network device, or is not expected to receive a first physical downlink control channel (PDCCH), the first PDCCH being used for the network device to schedule the second PDSCH for the first HARQ process.

16 Claims, 9 Drawing Sheets

(51) Int. Cl.
*H04W 72/1273* (2023.01)
*H04W 72/232* (2023.01)

(58) Field of Classification Search
CPC .......... H04W 72/1273; H04W 72/232; H04W 72/11; H04W 56/00; H04W 72/23
See application file for complete search history.

(56) References Cited

U.S. PATENT DOCUMENTS

| | | | | |
|---|---|---|---|---|
| 2024/0171320 | A1* | 5/2024 | Ijaz | H04W 76/28 |
| 2024/0260116 | A1* | 8/2024 | Ying | H04L 1/1854 |
| 2024/0305415 | A1* | 9/2024 | Park | H04L 1/1896 |
| 2025/0008506 | A1* | 1/2025 | Yoshioka | H04W 72/232 |

OTHER PUBLICATIONS

Written Opinion of the International Search Authority in the international application No. PCT/CN2021/139287, mailed on Jul. 29, 2022. 7 pages with English translation.

3GPP TSG RAN WG1 #106e R1-2108511, e-Meeting, Aug. 16-27, 2021, Source: Moderator (ZTE), Title: Summary#2 of Al 8.4.3 for HARQ in NTN, Agenda Item: 8.4.3, Document for: Discussion and Decision. section 1-5. 76 pages.

3GPP TSG RAN WG2 #113bis-e R2-2103950 (Revision of R2-2101493), E-Meeting, Apr. 12, 2021-Apr. 20, 2021, Agenda Item: 8.10.2.2, Source: Ericsson, Title: On scheduling, HARQ, and DRX for NTNs, Document for: Discussion, Decision. entire document. 27 pages.

3GPP TSG RAN WG1 Meeting #96bis R1-1905840, Xi'an, China, Apr. 8-Apr. 12, 2019, Agenda Item: 7.2.5.4, Source: MediaTek Inc., Title: Summary Delay-tolerant re-transmission mechanisms in NR-NTN, Document for: Discussion and Decision. entire document. 7 pages.

3GPP TSG RAN WG1 #107-e R1-2112664, e-Meeting, Nov. 11-19, 2021, Source: Moderator (ZTE), Title: Summary#3 of Al 8.4.3 for HARQ in NTN, Agenda Item: 8.4.3, Document for: Discussion and Decision. section: 2. 41 pages.

3GPP TR 21.905 V16.0.0 (Jun. 2019), 3rd Generation Partnership Project; Technical Specification Group Services and System Aspects; Vocabulary for 3GPP Specifications (Release 16). the whloe document. 66 pages.

* cited by examiner

COMMUNICATION METHOD AND APPARATUS, DEVICE, CHIP, STORAGE MEDIUM, PRODUCT AND PROGRAM

CROSS-REFERENCE TO RELATED APPLICATION

This application is a continuation application of International Patent Application No. PCT/CN2021/139287 filed on Dec. 17, 2021, the entire contents of which are incorporated herein by reference.

TECHNICAL FIELD

Embodiments of the disclosure relates to the technical field of communications, and in particular to a method and apparatus for communication, a device, a chip, a storage medium, a product and a program.

BACKGROUND

At present, the 3rd Generation Partnership Project (3GPP) is studying Non-Terrestrial Network (NTN) technology. The NTN generally provides a communication service to ground users by means of satellite communication.

In an NTN system, how to constrain scheduling of a physical downlink shared channels (PDSCH) is not concerned in the field.

SUMMARY

Embodiments of the disclosure provide a method and apparatus for communication, a device, a chip, a storage medium, a product and a program.

In a first aspect, embodiments of the disclosure provide a method for communication. The method includes following operations. A terminal device receives a first physical downlink shared channel (PDSCH) scheduled for a first hybrid automatic repeat request (HARQ) process from a network device. Within a first time range, the terminal device is not expected to receive a second PDSCH scheduled for the first HARQ process from the network device, or is not expected to receive a first physical downlink control channel (PDCCH). The first PDCCH is used for the network device to schedule the second PDSCH for the first HARQ process.

In a second aspect, embodiments of the disclosure provide a method for communication. The method includes following operations. A network device sends, to a terminal device, a first physical downlink shared channel (PDSCH) scheduled for a first hybrid automatic repeat request (HARQ) process. Within a second time range, the network device is not expected to send a second PDSCH scheduled for the first HARQ process to the terminal device, or is not expected to send a first physical downlink control channel (PDCCH) to the terminal device. The first PDCCH is used for the network device to schedule the second PDSCH for the first HARQ process.

In a third aspect, embodiments of the disclosure provide an apparatus for communication and include a transceiver.

The transceiver is configured to receive a first physical downlink shared channel (PDSCH) scheduled for a first hybrid automatic repeat request (HARQ) process from a network device. The transceiver is further configured to: within a first time range, not expect to receive a second PDSCH scheduled for the first HARQ process from the network device, or not expect to receive a first physical downlink control channel (PDCCH). The first PDCCH is used for the network device to schedule the second PDSCH for the first HARQ process.

In a fourth aspect, embodiments of the disclosure provide an apparatus for communication and include a transceiver.

The transceiver is configured to send, to a terminal device, a first physical downlink shared channel (PDSCH) scheduled for a first hybrid automatic repeat request (HARQ) process. The transceiver is further configured to: within a second time range, not expect to send a second PDSCH scheduled for the first HARQ process to the terminal device, or not expect to send a first physical downlink control channel (PDCCH) to the terminal device. The first PDCCH is used for scheduling the second PDSCH for the first HARQ process.

In a fifth aspect, embodiments of the disclosure provide a terminal device, including a processor and a memory. The memory is configured to store a computer program, and the processor is configured to call and run the computer program stored in the memory to perform the method for communication of the first aspect.

In a sixth aspect, embodiments of the disclosure provide a network device, including a processor and a memory. The memory is configured to store a computer program, and the processor is configured to call and run the computer program stored in the memory to perform the method for communication of the second aspect.

In a seventh aspect, embodiments of the disclosure provide a chip, including a processor configured to call and run a computer program from a memory and run the computer program to enable a device installed with the chip to perform the method for communication of the first aspect, or to enable a device installed with the chip to perform the method for communication of the second aspect.

In an eighth aspect, embodiments of the disclosure provide computer storage medium having stored thereon a computer program that enables a terminal device to perform the method for communication of the first aspect or enables a network device to perform the method for communication of the second aspect.

In a ninth aspect, embodiments of the disclosure provide a computer program product including computer program instructions that enable a terminal device to perform the method for communication of the first aspect or enable a network device to perform the method for communication of the second aspect.

In a tenth aspect, embodiments of the disclosure provide a computer program enabling a terminal device to perform the method for communication of the first aspect or enabling a network device to perform the method for communication of the second aspect.

In the embodiments of the disclosure, a terminal device receives a first physical downlink shared channel (PDSCH) scheduled for a first hybrid automatic repeat request (HARQ) process from a network device. Within a first time range, the terminal device is not expected to receive a second PDSCH scheduled for the first HARQ process from the network device, or is not expected to receive a first physical downlink control channel (PDCCH). The first PDCCH is used for the network device to schedule the second PDSCH for the first HARQ process. As such, scheduling of PDSCHs can be constrained, avoiding the terminal device from being out of order when receiving the PDSCHs.

BRIEF DESCRIPTION OF THE DRAWINGS

The drawings described herein serve for further understanding of the disclosure, and constitute a part of the disclosure. Exemplary embodiments of the disclosure and description thereof are used to explain the disclosure and do not form inappropriate limitation of the disclosure. In the drawings.

DETAILED DESCRIPTION

Technical solutions of the embodiments of the disclosure will be described below in conjunction with the drawings of the embodiments of the disclosure. Apparently, the described embodiments are some rather than all embodiments of the disclosure. All other embodiments obtained by those skilled in the art based on the embodiments of the disclosure without paying any inventive effort shall fall within the scope of protection of the disclosure. The technical solutions disclosed herein may be arbitrarily without conflict. In the description of the disclosure, “multiple” means two or more, unless otherwise specified clearly.

Figure 1:
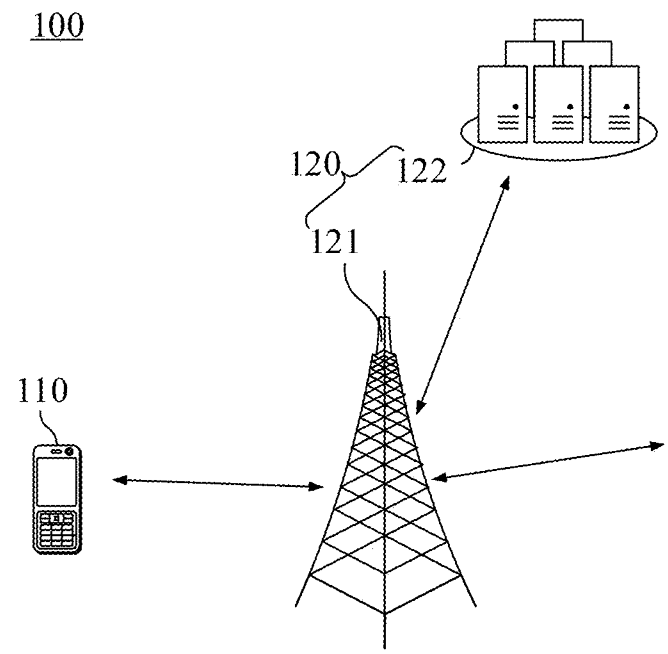
FIG. 1 illustrates a schematic diagram of an application scenario according to embodiments of the disclosure.

FIG. 1 illustrates a schematic diagram of an application scenario according to embodiments of the disclosure.

As illustrated in FIG. 1, a communication system 100 may include terminal devices 110 and a network device 120. The network device 120 may communicate with the terminal devices 110 through air interfaces. Multi-service transmission is supported between the terminal devices 110 and the network device 120.

It is to be understood that the communication system 100 is provided here to describe the embodiments of the disclosure in an exemplary way, but the embodiments of the disclosure are not limited thereto. That is to say, the technical solutions of the embodiments of the disclosure may be applied to various communication systems, for example a long term evolution (LTE) system, an LTE time division duplex (TDD) system, a universal mobile telecommunication system (UMTS), an Internet of Things (IoT) system, a narrow band Internet of Things (NB-IoT) system, an enhanced machine-type communications (eMTC) system, a 5th-generation communication system (or referred to as new radio (NR) communication system), or a future communication system (for example, a 6G or 7G communication system).

In the communication system 100 as illustrated in FIG. 1, the network device 120 may be an access network device communicating with the terminal device 110. The access network device can provide communication coverage for a specific geographical area, and can communicate with the terminal device 110 within the coverage.

The terminal device of the disclosure may also be referred to as user equipment (UE), a mobile station (MS), a mobile terminal (MT), a user unit, a user station, a mobile station, a remote station, a remote terminal, a mobile device, a user terminal, a terminal, a wireless communication device, a user agent or a user device. The terminal device may include one or a combination of at least two of the following: an Internet of Things (IoT) device; a satellite terminal; a Wireless Local Loop (WLL) station; a Personal Digital Assistant (PDA); a handheld device or computer device with a wireless communication function, or other processing devices connected to a wireless modem with a wireless communication function; a server; a mobile phone; a tablet; a computer with a wireless transceiving function; a palmtop; a desktop; a convenient media player; a smart sound box; a navigation device; wearable devices such as a smart watch, smart glasses and smart necklace; a step counter, a digital television (TV), a virtual reality (VR) terminal device, an Augmented Reality (AR) terminal device, a wireless terminal in industrial control; a wireless terminal in self driving; a wireless terminal in remote medical surgery; a wireless terminal in a smart grid; a wireless terminal in transportation safety; a wireless terminal in a smart city; a wireless terminal in a smart home; a vehicle, a vehicle-mounted device, a vehicle-mounted module, and a wireless modem in a vehicle-to-everything system; a handheld device; a Customer Premise Equipment (CPE); and an intelligent household appliance.

The network device 120 according to the embodiments of the disclosure may further include an access network device 121 and/or a core network device 122.

The access network device 121 may include one or a combination of at least two of the following: an evolutional Node B (eNB or eNodeB) in an LTE system, or a next generation radio access network (NG RAN) device, or a gNB, a small station or a micro station in an NR system, or a radio controller in a cloud radio access network (CRAN), an access mode of Wireless-Fidelity (Wi-Fi), a transmission reception point (TRP), a relay station, an access point, a vehicle-mounted device, a wearable device, a hub, a switch, a network bridge, a router, a network device in a future evolved public land mobile network (PLMN) or the like.

The core network device 122 may be a 5G Core (5GC) device. The core network device 122 may include one or a combination of at least two of the following: an Access and Mobility Management Function (AMF), an Authentication Server Function (AUSF), a User Plane Function (UPF), a Session Management Function (SMF), a Location Management Function (LMF). In some other implementations, the core network device may also be an evolved packet core (EPC) device in an LTE network, for example a session management function+core packet gateway (SMF+PGW-C) device. It is to be understood that the SMF+PGW-C can realize the functions of both an SMF and a PGW-C. During evolution of the network, the core network device 122 may also have other names, or the function of the core network may be divided to form new network entities, which are not limited in the embodiments of the disclosure.

The terminal device 110 may be any terminal device, including but not limited to a terminal device in wired or wireless connection with the network device 120 or another terminal device.

The terminal device 100 may be used in device to device (D2D) communication.

Various functional units of the communication system 100 may also establish a connection with one another through a next generation (NG) interface so as to realize communication.

For example, the terminal device establishes an air interface connection with an access network device through an NR interface, so as to transmit user plane data and a control plane signaling. The terminal device may establish a control plane signaling connection with the AMF through an NG interface 1 (N1 for short). The access network device for example a gNB may establish a user plane data connection with the UPF through an NG interface 3 (N3 for short). The access network device may establish a control plane signaling connection with the AMF through an NG interface 2 (N2 for short). The UPF may establish a control plane signaling connection with the SMF through an NG interface 4 (N4 for short). The UPF may exchange user plane data with a data network through a NG interface 6 (N6 for short). The AMF may establish a control plane signaling connection with the SMF through an NG interface 11 (N11 for short). The SMF may establish a control plane signaling connection through an NG interface 7 (N7 for short).

FIG. 1 exemplarily illustrates a base station, a core network device and two terminal devices. In some embodiments, the wireless communication system 100 may include multiple base stations, and there may be another number of terminal devices within the coverage of each base station, which is not limited in the embodiments of the disclosure.

The 3GPP is studying Non-Terrestrial Network (NTN) technology. The NTN generally provides a communication service to ground users by means of satellite communication. Compared to terrestrial cellular network communication, satellite communication has many unique advantages. Firstly, the satellite communication is not restricted by territory of users. For example, general terrestrial communication cannot cover areas where communication equipment cannot be built or where there is no communication coverage because of sparse population, such as oceans, high mountains and deserts. For satellite communication, since a satellite can cover a large area and the satellite can make orbital motion around the earth, every corner on the earth can be covered by satellite communication theoretically. Secondly, the satellite communicate has significant social values. The satellite can cover remote mountain areas, and poor countries or areas with low cost, so that people in these areas can enjoy advanced voice communication and mobile Internet technologies, facilitating reduce digital gaps with developed areas and promoting development of these areas. Again, the satellite communication can reach long distances, and communication cost does not increase significantly with the communication distance. Finally, the satellite communication has high stability and is not constrained by natural disasters.

The NTN technology may be combined with various communication systems. For example, the NTN technology may be combined with an NR system to form an NR-NTN system. For another example, the NTN technology may be combined with an Internet of Things (IoT) system to form an IoT-NTN system. As an example, the IoT-NTN system may include an NB-IoT-NTN system and an eMTC-NTN system.

Figure 2:
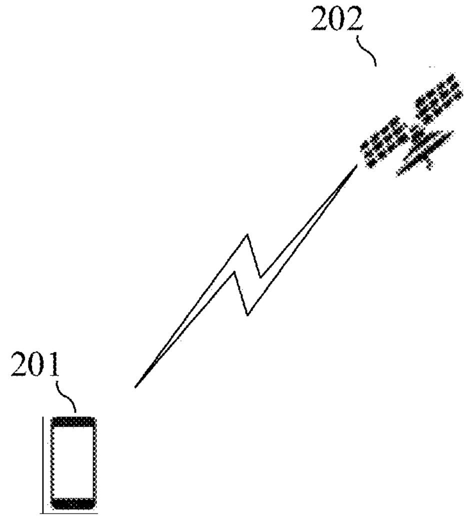
FIG. 2 illustrates a schematic diagram of architecture of a communication system according to embodiments of the disclosure.

FIG. 2 illustrates a schematic diagram of architecture of a communication system according to embodiments of the disclosure.

As illustrated in FIG. 2, the communication system includes a terminal device 201 and a satellite 202. The terminal device 201 and the satellite 202 may perform wireless communication with each other. The network formed between the terminal device 201 and the satellite 202 may also be referred to as an NTN. In the architecture of the communication system illustrated in FIG. 2, the satellite 202 may have the function of a base station, and the terminal device 201 and the satellite 202 may communicate with each other directly. In the system architecture, the satellite 202 may be referred to as a network device. In some embodiments of the disclosure, the communication system may include multiple network devices 202, and there may be another number of terminal devices within the coverage of each network device 202, which is not limited in the embodiments of the disclosure.

Figure 3:
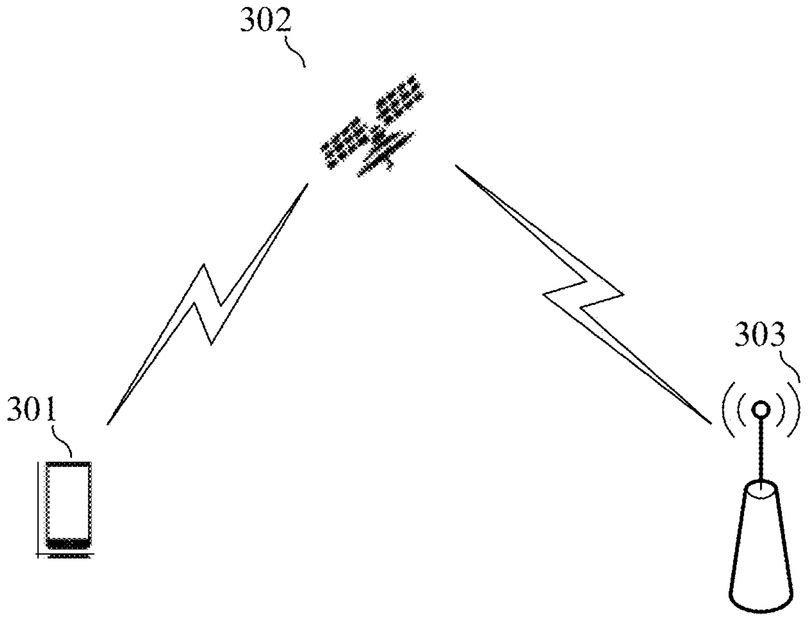
FIG. 3 illustrates a schematic diagram of architecture of another communication system according to embodiments of the disclosure.

FIG. 3 illustrates a schematic diagram of architecture of another communication system according to embodiments of the disclosure.

As illustrated in FIG. 3, the communication system includes a terminal device 301, a satellite 302 and a base station 303. The terminal device 301 and the satellite 302 may perform wireless communication with each other. The satellite 302 and the base station 303 may communicate with each other. The network formed among the terminal device 301, the satellite 302 and the base station 303 may also be referred to as an NTN. In the architecture of the communication system illustrated in FIG. 3, the satellite 302 may have the function of a base station, and communication between the terminal device 301 and the base station 303 needs to be relayed by the satellite 302. In such a system architecture, the base station 303 may be referred to as a network device. In some embodiments of the disclosure, the communication system may include multiple network devices 303, and there may be another number of terminal devices within the coverage of each network device 303, which is not limited in the embodiments of the disclosure. The network device 303 may be the network device 120 in FIG. 1.

It should be understood that the satellite 1102 or the satellite 302 includes but is not limited to: a low earth orbit (LEO) satellite, a medium earth orbit (MEO) satellite, a geostationary earth orbit (GEO) satellite, a high elliptical orbit (HEO) satellite, and so on. The satellite may cover the ground by multiple beams. For example, a satellite may form dozens or even hundreds of beams to cover the ground. In other words, a satellite beam can cover a ground area with a diameter of dozens or even hundreds of kilometers, to ensure the coverage of the satellite and promote the system capacity of the entire satellite communication system.

As an example, a height range of the LEO satellite may be 500 kilometers to 1500 kilometers, which corresponds to an orbital period of 1.5 to 2 hours. The signal propagation delay of a single-hop communication of a user may generally be smaller than 20 milliseconds, and the maximum visible time of the satellite may be 20 seconds. The LEO satellite has a short signal propagation distance and low link loss, and has low requirements on the transmitting power of a user terminal. The GEO satellite may have an orbital altitude of 35786 km, and may have a rotating period around the earth of 24 hours. The signal propagation delay of a single-hop communication of a user may generally be 250 milliseconds.

In order to ensure the coverage of the satellite and promote the system capacity of the entire satellite communication system, the satellite covers the ground by multiple beams. One satellite may form dozens or even hundreds of beams to cover the ground. One satellite beam can cover a ground area with a diameter of dozens or even hundreds of kilometers.

It is to be noted that FIGS. 1 to 3 merely illustrate a system to which the disclosure is applicable in an exemplary way. Of course, the method illustrated in the embodiments of the disclosure may also be applicable to other systems. In addition, the terms "system" and "network" herein are exchangeable. The term "and/or" herein merely describes a relation between associated objects, representing that three relations may exist. For example A and/or B may represent following three cases: existence of A alone, existence of both A and B, and existence of B alone. The character "/" generally indicates that the contextual objects are in an "or" relationship. It is also to be understood that "indicate" referred to in the embodiments of the disclosure may be direct indication or indirect indication, or may refer to that there is an association relationship. By way of example, "A indicates B" may refer to that A directly indicates B, for example B can be acquired through A. "A indicates B" may also refer to that A indirectly indicates B, for example, A indicates C and B can be acquired through C. "A indicates B" may also refer to that there is an association relationship between A and B. It is to be also understood that "correspond" referred to in the embodiments of the disclosure may mean that there is a direct correspondence or indirect correspondence between two objects, or may mean that there is an association relationship between the two object, or may mean a relationship that one object indicates or is indicated by another object or a relationship that one object configures or is configured by another object. It also to be understood that "predefine", "agreed in protocol", "predetermined", or "predefined rule" mentioned in the embodiments of the disclosure may be realized by codes or forms pre-stored in a device (for example, a terminal device and a network device) or in other ways that can be used to indicate relevant information. The particular implementation is not limited in the disclosure. For example, "predefined" may refer to being defined in a protocol. It is also to be understood that, in the embodiments of the disclosure, the "protocol" may refer to specification protocols in the field of communications, for example LTE protocols, NR protocols or relevant protocols applied in future communication systems, which is not limited in the embodiments of the disclosure.

There are two types of satellites, i.e., transparent payload satellites and regenerative payload satellites, depending on the function provided thereby. A transparent payload satellite provides only functions of radio frequency filtering, frequency conversion and amplification, and only forwards signals transparently without changing the waveform signals forwarded thereby. Besides the functions of radio frequency filtering, frequency conversion and amplification, a regenerative satellite may further provide functions of demodulation/decoding, routing/converting, and encoding/modulation, and may have some or all functions of a base station.

In NTN, there may be one or more than one gateway, for communication between a satellite and a terminal.

Figure 4:
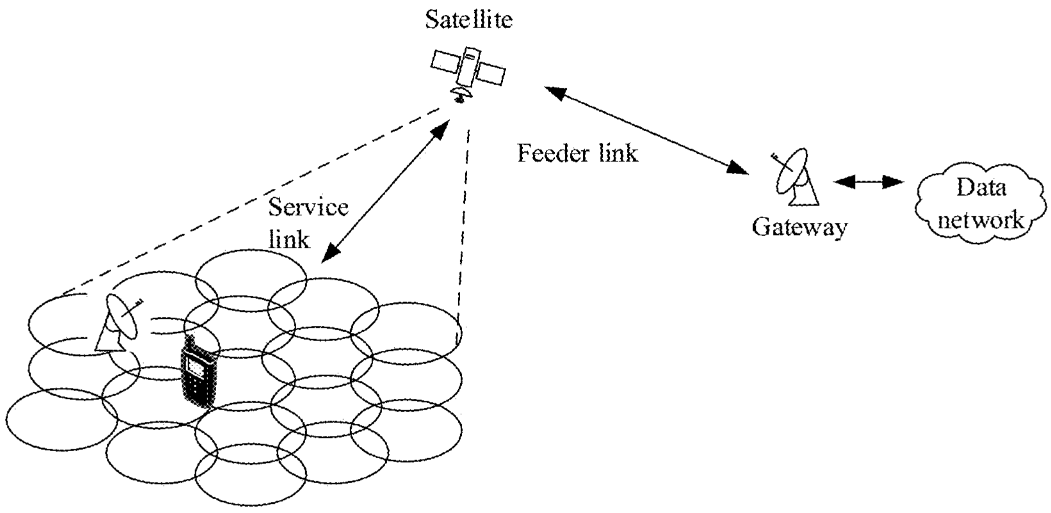
FIG. 4 illustrates a schematic diagram of an NTN scenario based on a transparent payload satellite according to embodiments of the disclosure.
Figure 5:
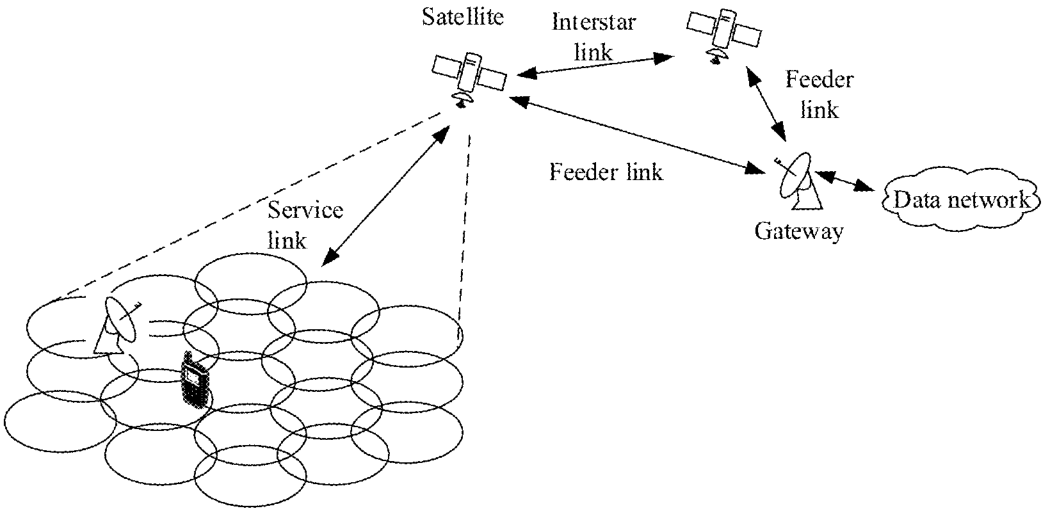
FIG. 5 illustrates a schematic diagram of an NTN scenario based on a regenerative payload satellite according to embodiments of the disclosure.

FIGS. 4 and 5 illustrate a schematic diagram of an NTN scenario based on a transparent payload satellite and a regenerative payload satellite respectively according to embodiments of the disclosure.

As illustrated in FIG. 4, for the NTN based on the transparent payload satellite, communication between a gateway and the satellite is implemented by a feeder link, and communication between the satellite and a terminal is implemented by a service link. As illustrated in FIG. 5, for the NTN scenario based on the regenerative payload satellite, communication between a satellite and another satellite is implemented via an InterStart link. Communication between a gateway and a satellite is implemented by a feeder link. Communication between a satellite and a terminal is implemented by a service link.

Each service cell corresponding to a terminal device has a respective Hybrid Automatic Repeat reQuest (HARQ) entity. Each HARQ entity maintains a group of parallel downlink HARQ processes and a group of parallel uplink HARQ processes. Each HARQ process may correspond to an HARQ ID.

For downlink transmission, the terminal device detects downlink control information (DCI) according to configured DCI format 1_0, configured DCI format 1_1 or configured DCI format 1_2, and performs PDSCH decoding according to scheduling of the DCI. In some embodiments, for scheduling downlink transmission using a specific HARQ process ID, there are following constraint in scheduling: the terminal device is not expected to receive another PDSCH for a specified HARQ process, until the end of expected transmission of HARQ acknowledge (HARQ-ACK) of the HARQ process.

In other words, if the terminal device receives a first PDSCH scheduled for a first HARQ process from a network device, the terminal device is not expected to receive a second PDSCH scheduled for the first HARQ process from the network device before the terminal device receives first HARQ-ACK feedback information corresponding to the first PDSCH from the network device. A time sequence for the transmission of the first HARQ-ACK feedback information from the terminal device to the network device is determined according to at least one of: a set of HARQ feedback time sequences or an HARQ feedback timing value K1. The set of HARQ feedback time sequences may be preset or may be configured by the network device. The HARQ feedback timing value K1 is a value in the set of HARQ feedback time sequences.

Figure 6:
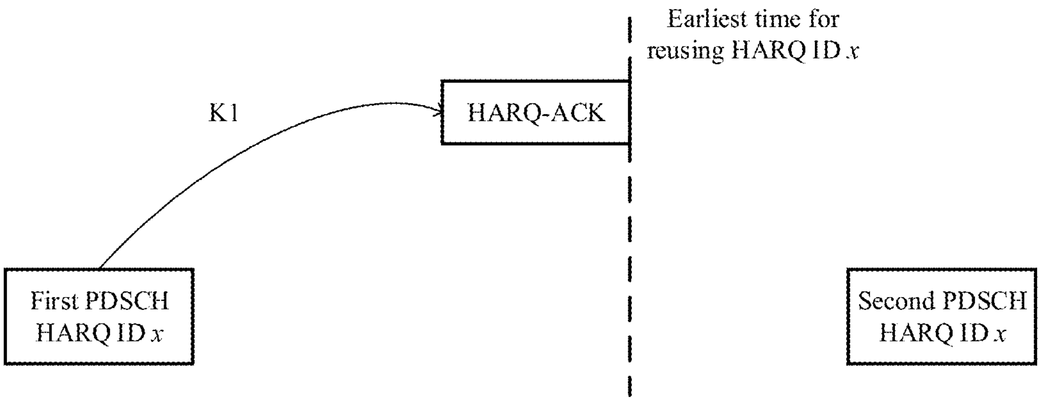
FIG. 6 illustrates a schematic diagram of transmission of HARQ-ACK information according to embodiments of the disclosure.

FIG. 6 illustrates a schematic diagram of transmission of HARQ-ACK information according to embodiments of the disclosure. As illustrated in FIG. 6, HARQ ID x corresponds to a first HARQ process. In a case that the terminal device receives a first PDSCH scheduled for the first HARQ process from the network device corresponding to the HARQ ID x, the terminal device sends HARQ-ACK feedback information corresponding to the first PDSCH to the network device by a transmission time sequence K1. The time when the transmission of the HARQ-ACK feedback information is completed is an earliest time when the HARQ ID x may be reused. After the transmission of the HARQ-ACK feedback information is completed, the terminal device may receive a second PDSCH scheduled for the first HARQ process from the network device corresponding to the HARQ ID x. It can be seen from FIG. 6 that the time when the transmission of the HARQ-ACK feedback information is completed is the earliest time when the HARQ ID x may be reused.

In the NTN system, a downlink HARQ process of the terminal device may be configured to be two modes respectively, which correspond to enabled HARQ-ACK feedback and disabled HARQ-ACK feedback respectively. In a case where a downlink HARQ process of the terminal device is configured with disabled HARQ-ACK feedback, for transmission of scheduled downlink (DL) HARQ process, the terminal device may not feed back HARQ-ACK information for the HARQ process. In some embodiments of the disclosure, the downlink HARQ process configured with disabled HARQ-ACK feedback may also be referred to as an HARQ feedback disabled downlink HARQ process. Correspondingly, for the downlink HARQ process configured with disabled HARQ feedback, there are following constraint in scheduling:

It is assumed that the first HARQ process is configured with disabled HARQ-ACK feedback. If the terminal device receives a first PDSCH scheduled for a first HARQ process from a network device, starting from end of reception of the first PDSCH to end of a first duration, the terminal device is not expected to further receive a first physical downlink control channel (PDCCH) corresponding to a second PDSCH scheduled by the network device for the first HARQ process.

Optionally, the first duration has a length of T_proc, 1. The T_proc, 1 is determined according to a PDSCH decoding time N1 (in unit of symbols).

The first PDSCH may be a PDSCH or may be a set of slot-aggregated PDSCHs.

The second PDSCH may be a PDSCH or may be a set of slot-aggregated PDSCHs.

A transport block (TB) of the first PDSCH may be the same as or may be different from that of the second PDSCH.

A processing capability 1 and processing capability 2 of the UE correspond to different processing capabilities respectively, in other words, N1 corresponding to the processing capability 1 of the UE is different from N1 corresponding to the processing capability 2 of the UE. The value of N1 is different under different subcarrier spacings.

As an example but not limiting, $T_{proc,1}=(N_1+d_{1,1}+d_2)(2048+144)\cdot\kappa 2^{-\mu}\cdot T_c+t_{ext}$. It is to be noted that, $T_{proc,1}$ has the same meaning as T_proc, 1. The calculation manner of T_proc, 1 may be specified by a protocol or by an evolved protocol. The calculation manner of T_proc, 1 is not limited in the embodiments of the disclosure.

Figure 7:
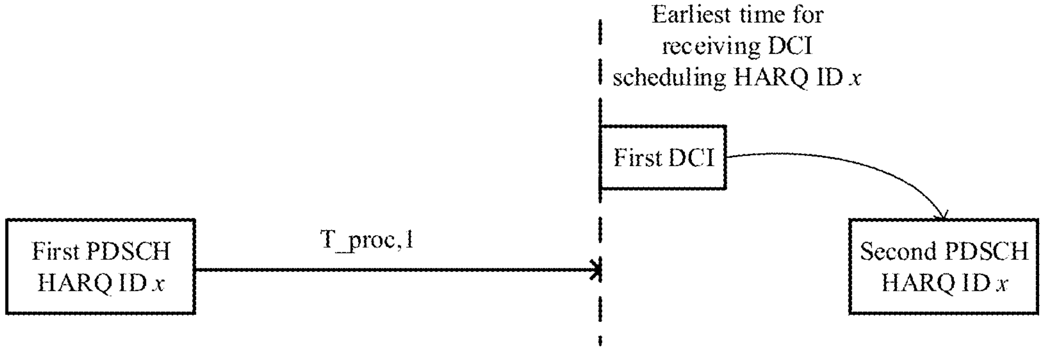
FIG. 7 illustrates another schematic diagram of transmission of HARQ-ACK information according to embodiments of the disclosure.

FIG. 7 illustrates another schematic diagram of transmission of HARQ-ACK information according to embodiments of the disclosure. As illustrated in FIG. 7, HARQ ID x corresponds to a first HARQ process. In a case that the terminal device receives a first PDSCH scheduled for the first HARQ process from the network device corresponding to the HARQ ID x, a period starting from end of reception of the first PDSCH to end of the first duration e.g., T_proc, 1 is the earliest time when the DCI scheduling the HARQ ID x can be received. After the end of the first duration, the terminal device may receive first DCI, and determine a second PDSCH scheduled by the first DCI for the first HARQ process corresponding to the HARQ ID x.

In the NTN system, HARQ-ACK feedback corresponding to semi-persistent scheduling (SPS) configuration activation may be enabled by the network device through radio resource control (RRC) configuration.

In some embodiments, when the network device enables the HARQ-ACK feedback corresponding to the SPS configuration activation through the RRC configuration, regardless of whether an HARQ process corresponding to a 1st SPS PDSCH is configured with enabled HARQ-ACK feedback or disabled HARQ-ACK feedback after the SPS configuration activation, the terminal device needs to report ACK or NACK information corresponding to the 1st SPS PDSCH that follows the SPS configuration activation.

In some other embodiments, when the network device does not implement RRC configuration to enable the HARQ-ACK feedback for the SPS configuration activation or the network device implements the RRC configuration but does not enable the HARQ-ACK feedback corresponding to the SPS configuration activation, when an HARQ process corresponding to a 1st SPS PDSCH is configured with enabled HARQ-ACK feedback after the SPS configuration activation, the terminal device needs to report ACK or NACK information corresponding to the 1st SPS PDSCH that follows the SPS configuration activation. When the HARQ process corresponding to a 1st SPS PDSCH is configured with disabled HARQ-ACK feedback after the SPS configuration activation, the terminal device does not report ACK or NACK information corresponding to the 1st SPS PDSCH that follows the SPS configuration activation.

After SPS configuration activation, for any other SPS PDSCH than the 1st SPS PDSCH, when an HARQ process corresponding to the SPS PDSCH is configured with enabled HARQ-ACK feedback, the terminal device reports ACK or NACK information corresponding to the SPS PDSCH. When the HARQ process corresponding to the SPS PDSCH is configured with disabled HARQ-ACK feedback, the terminal device does not report ACK or NACK information corresponding to the SPS PDSCH.

However, in the NTN system, HARQ-ACK information corresponding to the $1^{st}$ SPS PDSCH is fed back in some cases, and is not fed back in some other cases. Therefore, how to determine a scheduling constraint for an SPS PDSCH is to be considered.

For convenience of understanding the technical solution of the embodiments of the disclosure, the technical solution of the disclosure will be described in detail via particular embodiments. Any combination formed by the above r\solutions as optional solutions and the technical solutions of the embodiments of the disclosure shall fall within the scope of protection of the embodiments of the disclosure. The embodiments of the disclosure include at least part of the following content.

Figure 8:
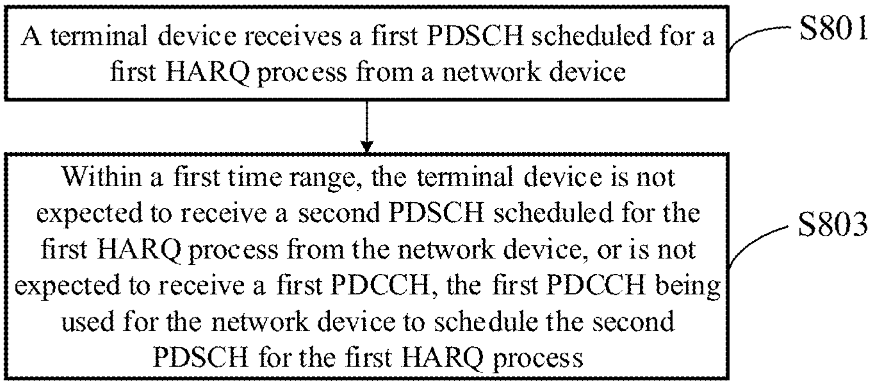
FIG. 8 illustrates a schematic flowchart of a method for communication according to embodiments of the disclosure.

FIG. 8 illustrates a schematic flowchart of a method for communication according to embodiments of the disclosure. As illustrated in FIG. 8, the method includes S801 and S803.

At S801, a terminal device receives a first PDSCH scheduled for a first HARQ process from a network device.

In some embodiments, the first PDSCH is a 1st PDSCH after SPS configuration activation. In such a case, the first PDSCH may be activated by a PDCCH, or the first PDSCH may be called a PDSCH corresponding to or associated with a PDCCH.

In some embodiments, the first PDSCH may be scheduled by a PDCCH.

In some embodiments, the first PDSCH may be an SPS PDSCH corresponding to no PDCCH. In such a case, a resource of the first PDSCH may be preconfigured, and the first PDSCH may not correspond to or may be not associated with a PDCCH, or the first PDSCH may be not a 1st PDSCH after the SPS configuration activation.

It needs to be noted that, for the activated SPS configuration, the 1st PDSCH after the SPS configuration activation may correspond to or be associated with a PDCCH, and any PDSCH other than the first PDSCH may correspond to or may be associated with no PDSCH. That is to say, any PDSCH other than the first PDSCH is an SPS PDSCH corresponding to no PDCCH. For example, any PDSCH other than the first PDSCH may correspond to or be associated with RRC.

Optionally, the first HARQ process may be configured with enabled HARQ-ACK feedback, or the first HARQ process may be configured with disabled HARQ-ACK feedback.

In some embodiments, HARQ-ACK may include ACK and NACK, or HARQ-ACK may include ACK or NACK.

At S803, within a first time range, the terminal device is not expected to receive a second PDSCH scheduled for the first HARQ process from the network device, or is not expected to receive a first physical downlink control channel (PDCCH). The first PDCCH is used for the network device to schedule the second PDSCH for the first HARQ process.

In some embodiments, an implementation of S803 may include that: within the first time range, the terminal device does not monitor, or fails to monitor or fails to detect the second PDSCH or the first PDCCH sent by the network device.

In such a way, in a case that the network device sends the first PDSCH to the terminal device, the network device does not send the second PDSCH or the first PDCCH to the terminal device within a second time range, and within the first time range, the terminal device does not monitor, or fails to monitor or fails to detect the second PDSCH or the first PDCCH sent by the network device. As such, resource waste caused due to a situation that the network device still schedule the second PDSCH or the first PDCCH to the terminal device when the terminal device is not expected to receive the second PDSCH or the first PDCCH can be avoided.

In some other embodiments, an implementation of S803 may include that: the terminal device may monitor or detect, in a first time range, a first PDCCH from the network device, but the terminal device may not receive, monitor or detect a second PDSCH scheduled by the first PDCCH, or the terminal device may not respond to or may neglect the monitored or detected second PDSCH or first PDCCH.

In such a way, in a case that the network device sends the first PDSCH to the terminal device, the network device may also send the second PDSCH or the first PDCCH to the terminal device within a second time range, so that within the first time range, the terminal device can monitor or detect the second PDSCH or the first PDCCH sent by the network device. However, the terminal device may not receive the second PDSCH, so that there is no need to change the configuration of the network device sending the second PDSCH or the first PDCCH.

In the embodiments of the disclosure, a terminal device receives a first PDSCH scheduled for a first HARQ process from a network device. Within a first time range, the terminal device is not expected to receive a second PDSCH scheduled for the first HARQ process from the network device, or is not expected to receive a first PDCCH. The first PDCCH is used for the network device to schedule the second PDSCH for the first HARQ process. As such, scheduling of PDSCHs can be constrained, avoiding out-of-order of the terminal device when receiving the PDSCHs.

In some embodiments, the first time range starts at end of reception of the first PDSCH. In some embodiments, the first time range ends at end of transmission, from the terminal device to the network device, of first HARQ acknowledgement (HARQ-ACK) feedback information corresponding to the first PDSCH. Optionally, in such a case, the terminal device may send the first HARQ-ACK feedback information corresponding to the first PDSCH to the network device. That is to say, in the case of receiving the first PDSCH, the terminal device may send the HARQ-ACK feedback information corresponding to the first PDSCH to the network device.

Optionally, the end of the transmission of the HARQ-ACK feedback information may be determined based on a timing advance (TA). For example, the terminal device receives the first PDSCH at time n, then the terminal device may determine to feed back the first HARQ-ACK feedback information corresponding to the first PDSCH at a time after the time n for a specified duration TO. Considering TA, the terminal device may send the first HARQ-ACK feedback information corresponding to the first PDSCH at the time n+T0−TA. Optionally, the time n, the time after the time n for the specified duration TO, and the time n+T0−TA herein may refer to symbols, time slots, mini time slots, subframes or radio frames.

Optionally, the end of the transmission of the HARQ-ACK feedback information may be determined based on an uplink time sequence of the terminal device.

Optionally, in some other embodiments, the HARQ-ACK feedback information may be referred to as HARQ-ACK feedback, HARQ feedback, HARQ process feedback or the like.

In some embodiments, the first HARQ process may be configured with disabled HARQ-ACK feedback, or the first HARQ process may be configured with enabled HARQ-ACK feedback.

The first time range corresponding to a case that the first HARQ process is configured with disabled HARQ-ACK feedback or enabled HARQ-ACK is described below by way of example respectively.

In some implementations, in the case that the first HARQ process is configured with disabled HARQ-ACK feedback, start of the first time range may be end of reception of the first PDSCH, and end of the first time range is end of transmission, from the terminal device to the network device, of first HARQ acknowledgement (HARQ-ACK) feedback information corresponding to the first PDSCH.

Exemplarily, in the case that the first HARQ process is configured with disabled HARQ-ACK feedback, regardless of if the terminal device is configured with enabled HARQ-ACK feedback corresponding to SPS configuration activation, the start of the first time range is the end of reception of the first PDSCH, and the end of the first time range is the end of the transmission, from the terminal device to the network device, of the first HARQ-ACK feedback information corresponding to the first PDSCH.

In some embodiments, in the case that the first HARQ process is configured with enabled HARQ-ACK feedback, start of the first time range may be end of reception of the first PDSCH, and end of the first time range may be end of transmission, from the terminal device to the network device, of first HARQ acknowledgement (HARQ-ACK) feedback information corresponding to the first PDSCH corresponding to the first PDSCH.

Exemplarily, in the case that the first HARQ process is configured with enabled HARQ-ACK feedback, regardless of if the terminal device is configured with enabled HARQ-ACK feedback corresponding to SPS configuration activation, the start of the first time range is the end of reception of the first PDSCH, and end of the first time range is end of the transmission, from the terminal device to the network device, of the first HARQ-ACK feedback information corresponding to the first PDSCH.

In some embodiments, not only whether the first HARQ process is configured with enabled HARQ-ACK feedback or disabled HARQ-ACK feedback needs to be considered, but also whether the terminal device is configured with enabled HARQ-ACK feedback corresponding to SPS configuration activation or not needs to be considered.

In some embodiments, if the terminal device is configured with enabled HARQ-ACK feedback corresponding to SPS configuration activation and/or the first HARQ process corresponds to enabled HARQ-ACK feedback, then the terminal device may determine that first HARQ-ACK feedback information needs to be sent to the network device; as such, start of the first time range is end of reception of the first PDSCH, and end of the first time range is end of the transmission, from the terminal device to the network device, of the first HARQ-ACK feedback information corresponding to the first PDSCH.

In some embodiments, if the terminal device is configured with enabled HARQ-ACK feedback corresponding to SPS configuration activation, and the first HARQ process is configured with enabled HARQ-ACK feedback, start of the first time range may be end of reception of the first PDSCH, and end of the first time range may be end of the transmission, from the terminal device to the network device, of the first HARQ-ACK feedback information corresponding to the first PDSCH.

In some other embodiments, if the terminal device is configured with enabled HARQ-ACK feedback corresponding to SPS configuration activation, and the first HARQ process is configured with disabled HARQ-ACK feedback, start of the first time range may be end of reception of the first PDSCH, and end of the first time range may be end of the transmission, from the terminal device to the network device, of the first HARQ-ACK feedback information corresponding to the first PDSCH.

In some other embodiments, if the terminal device is not configured with enabled HARQ-ACK feedback corresponding to SPS configuration activation, and the first HARQ process is configured with enabled HARQ-ACK feedback, start of the first time range may be end of reception of the first PDSCH, and end of the first time range may be end of the transmission, from the terminal device to the network device, of the first HARQ-ACK feedback information corresponding to the first PDSCH.

In some other embodiments, if the first PDSCH corresponds to first HARQ-ACK feedback, start of the first time range may be end of reception of the first PDSCH, and end of the first time range may be end of the transmission, from the terminal device to the network device, of the first HARQ-ACK feedback information corresponding to the first PDSCH.

Optionally, the case that the first PDSCH corresponds to first HARQ-ACK feedback may be understood as that the terminal device needs to send the first HARQ-ACK feedback information to the network device. The first PDSCH is transmitted through the first HARQ process. The first HARQ-ACK feedback information may be determined by the terminal device according to a decoding result of the first PDSCH, or may be a preset value, e.g., ACK or NACK configured by the network device to the terminal device.

Optionally, the transmission time sequence for the terminal device to send the first HARQ-ACK feedback information corresponding to the first PDSCH to the network device may be preconfigured by the terminal device, or may be configured by the network device, or may be formulated by a protocol, or may be calculated by the terminal device, or may be calculated by the network device and configured to the terminal device. The terminal device may determine the end of the first time range based on the transmission time sequence for the first HARQ-ACK feedback information.

In some embodiments, the transmission time sequence for the terminal device to send the first HARQ-ACK feedback information to the network device may be determined by the terminal device. For example, the time sequence for the transmission of the first HARQ-ACK feedback information from the terminal device to the network device may be determined according to at least one of following: a set of HARQ feedback time sequences, an offset value Koffset, or an HARQ feedback timing value K1.

Optionally, the time sequence for transmission of the first HARQ-ACK feedback information may be a value obtained by subtracting a timing advance. For example, the time sequence for transmission of the first HARQ-ACK feedback information may be the above duration T0−TA. Alternatively, the time sequence for transmission of the first HARQ-ACK feedback information may be a value obtained by subtracting no timing advance. For example, the time sequence for transmission of the first HARQ-ACK feedback information may be the above duration T0.

Optionally, the set of HARQ feedback time sequences may be preset by the terminal device, or may be configured by the network device, or may be formulated by a protocol. The set of HARQ feedback time sequences may include one or more than one HARQ feedback timing value K1, and each of one or more than one time sequence may be in units of subframes, time slots, mini time slots, symbols or the like.

Optionally, the offset value Koffset may be configured by the NTN network. The offset value Koffset may be a cellular common offset value which may be broadcast by the network device, or the offset value Koffset may be a dedicated offset value of the terminal device. The dedicated offset value of the terminal device may be configured by the network device to the terminal device, or may be determined by the terminal device based on an offset increment configured by the network device.

Optionally, the HARQ feedback timing value K1 may be configured by the network device to the terminal device, or may be preset by the terminal device, or may be agreed in a protocol, or may be calculated by the terminal device, or may be calculated by the network device and configured to the terminal device.

In some other embodiments, the first time range may start at end of reception of the first PDSCH. A duration corresponding to the first time range may be a first duration. Optionally, in such a case, the terminal device may send no first HARQ-ACK feedback information corresponding to the first PDSCH to the network device.

Optionally, the first duration may be the above T_proc, 1.

In some embodiments, the first HARQ process may be configured with disabled HARQ-ACK feedback, or the first HARQ process may be configured with enabled HARQ-ACK feedback.

The first time range corresponding to a case that the first HARQ process is configured with disabled HARQ-ACK feedback or enabled HARQ-ACK is described below by way of example respectively.

In some embodiments, in the case that the first HARQ process is configured with disabled HARQ-ACK feedback, the first time range may start at end of reception of the first PDSCH, and a duration corresponding to the first time range may be a first duration.

Exemplarily, in the case that the first HARQ process is configured with disabled HARQ-ACK feedback, regardless of if the terminal device is configured with enabled HARQ-ACK feedback corresponding to SPS configuration activation, start of the first time range may be end of reception of the first PDSCH, and a duration corresponding to the first time range may be a first duration.

In some embodiments, in the case that the first HARQ process is configured with enabled HARQ-ACK feedback, start of the first time range may be end of reception of the first PDSCH; and a duration corresponding to the first time range may be a first duration.

Exemplarily, in the case that the first HARQ process is configured with enabled HARQ-ACK feedback, regardless of if the terminal device is configured with enabled HARQ-ACK feedback corresponding to SPS configuration activation, start of the first time range may be end of reception of the first PDSCH, and a duration corresponding to the first time range may be a first duration.

In some embodiments, not only whether the first HARQ process is configured with enabled HARQ-ACK feedback or disabled HARQ-ACK feedback needs to be considered, but also whether the terminal device is configured with enabled HARQ-ACK feedback corresponding to SPS configuration activation or not needs to be considered.

In some embodiments, if the terminal device is not configured with enabled HARQ-ACK feedback corresponding to SPS configuration activation and the first HARQ process is not configured with a need to perform HARQ-ACK feedback, then the terminal device may determine that there is no need to send first HARQ-ACK feedback information to the network device. As such, start of the first time range may be end of reception of the first PDSCH, and a duration corresponding to the first time range may be a first duration.

In some embodiments, if the terminal device is not configured with enabled HARQ-ACK feedback corresponding to SPS configuration activation and the first HARQ process is configured with disabled HARQ-ACK feedback, start of the first time range may be end of reception of the first PDSCH; and a duration corresponding to the first time range may be a first duration.

In some other embodiments, if the first PDSCH corresponds to no HARQ-ACK feedback, start of the first time range may be end of reception of the first PDSCH; and a duration corresponding to the first time range may be a first duration.

Optionally, the case that the first PDSCH corresponds to no first HARQ-ACK feedback may be understood as that the terminal device does not need to send the first HARQ-ACK feedback information to the network device. The case that the first PDSCH corresponds to no first HARQ-ACK feedback may be determined by the terminal device itself, or may be configured by the network device to the terminal device.

In some other feasible embodiments, if one of the terminal device and the first HARQ process is configured with a need to perform HARQ-ACK feedback, and the other is not configured with a need to perform HARQ-ACK feedback, then the terminal device may determine that there is no need to send first HARQ-ACK feedback information to the network device. As such, start of the first time range is end of reception of the first PDSCH, and a duration corresponding to the first time range is a first duration.

Optionally, the case that one of the terminal device and the first HARQ process is configured with a need to perform HARQ-ACK feedback and the other is not configured with a need to perform HARQ-ACK feedback may include: the terminal device is configured with enabled HARQ-ACK feedback corresponding to SPS configuration activation, and the first HARQ process is configured with disabled HARQ-ACK feedback; or the terminal device is not configured with enabled HARQ-ACK feedback corresponding to SPS configuration activation, and the first HARQ process is configured with enabled HARQ-ACK feedback.

In some embodiments, the first duration may be determined according to at least one of following: a processing capability of the terminal device, a subcarrier spacing, or a decoding duration for the first PDSCH.

Optionally, the decoding duration N1 of the first PDSCH may be in units of symbols. Optionally, terminal devices with different processing capabilities may correspond to different values of the decoding duration N1 of the first PDSCH. Exemplarily, the processing capability 1 and the processing capability 2 of the terminal device may correspond to different processing capabilities respectively. An N1 value corresponding to the processing capability 1 of the terminal device may be different from the processing capability 2 of the terminal device. Optionally, the decoding duration N1 of the first PDSCH may be the same under different subcarrier spacings.

Optionally, the decoding duration for the first PDSCH may be preset by the terminal device, or may be configured by the network device to the terminal device, or may be formulated in a protocol, or may be calculated by the terminal device, or may be calculated by the network device and configured to the terminal device.

In some embodiments, the enabled HARQ-ACK feedback corresponding to SPS configuration after activationactivation may be configured by RRC signaling. The network device may configure the enabled HARQ-ACK feedback corresponding to SPS configuration activation through RRC signaling.

Exemplarily, the case that the terminal device is configured with enabled HARQ-ACK feedback corresponding to SPS configuration activation may include that: the terminal device is configured with enabled HARQ-ACK feedback corresponding to SPS configuration activation through RRC signaling.

The case that the terminal device is not configured with enabled HARQ-ACK feedback corresponding to SPS configuration activation may include that: the terminal device is configured with disabled HARQ-ACK feedback corresponding to SPS configuration activation by the network device through RRC; or the terminal device is not configured by the network device through RRC signaling for enabling HARQ-ACK feedback corresponding to SPS configuration activation.

In this way, the network device may enable, through the RRC configuration, HARQ-ACK feedback corresponding to SPS configuration activation. Feedback of an HARQ process associated with an SPS PDSCH may be started or forbidden by RRC configuration per SPS configuration. The HARQ-ACK corresponding to activation may include: starting or forbidding the HARQ-ACK feedback. Starting the HARQ-ACK feedback may correspond to enabled HARQ-ACK feedback, and forbidding the HARQ-ACK feedback may correspond to disabled HARQ-ACK feedback.

In some embodiments, the event that the terminal device is not expected to receive the second PDSCH scheduled for the first HARQ process from the network device may include that: when the terminal device is scheduled by the network device to use the first HARQ process to receive the second PDSCH within the first time range, the terminal device refrains from receiving the second PDSCH. In such a case, the terminal device can monitor or detect the first PDCCH scheduling the second PDSCH or may know, through preconfiguration, that the first time range contains a resource for transmitting the second PDSCH, but the terminal device does not receive the second PDSCH.

In some other embodiments, the event that the terminal device is not expected to receive the first PDCCH may include that: when the terminal device is scheduled by the network device to receive the first PDCCH within the first time range, the terminal device refrains from receiving the second PDSCH scheduled by the first PDCCH. In such a case, the terminal device can monitor or detect the first PDCCH, but the terminal device does not receive the second PDSCH scheduled by the first PDCCH.

In some embodiments, the second PDSCH may be scheduled by a PDCCH.

In some embodiments, the second PDSCH may be an SPS PDSCH corresponding to no PDCCH. In such a case, the second PDSCH may be preconfigured, and the second PDSCH is not a 1st PDSCH after the SPS configuration activation.

In some embodiments, the method may further include that:

- in a case that a second HARQ process is configured with enabled HARQ-ACK feedback, the terminal device receives a third PDSCH scheduled for the second HARQ process from the network device, the third PDSCH being an SPS PDSCH corresponding to no PDCCH; and
- from end of reception of the third PDSCH to end of transmission, from the terminal device to the network device, of second HARQ-ACK feedback information corresponding to the third PDSCH, the terminal device is not expected to receive a fourth PDSCH scheduled for the second HARQ process from the network device, or is not expected to receive a second PDCCH, the second PDCCH being used for the network device to schedule the fourth PDSCH for the second HARQ process.

In some embodiments, the method may further include that:

- in a case that a second HARQ process is configured with disabled HARQ-ACK feedback, the terminal device receives a third PDSCH scheduled for the second HARQ process from the network device, the third PDSCH being an SPS PDSCH corresponding to no PDCCH; and
- from end of reception of the third PDSCH to end of a second duration, the terminal device is not expected to receive a fourth PDSCH scheduled for the second HARQ process from the network device, or is not expected to receive a second PDCCH, the second PDCCH being used for the network device to schedule the fourth PDSCH for the second HARQ process.

In some embodiments, the first duration and the second duration may be the same.

In some embodiments, the first time range and the second time range may be the same.

Optionally, the second HARQ process may be after the first HARQ process.

Optionally, in the embodiments of the disclosure, the second HARQ process may be an HARQ process corresponding at least one SPS PDSCH other than the 1st SPS PDSCH after the SPS configuration activation.

Optionally, the first time range may be a continuous time range. A start moment of the first time range may be a first moment, and an end moment (or referred to as a tail moment) of the first time range may be a second moment after the first moment. A duration between the first moment and the second moment may be a specific duration. The first time range may include the first moment, or the first time range may not include the first moment. The first time range may include the second moment, or the first time range may not include the second moment.

Optionally, the start moment of the first time range may be the end moment of reception of the first PDSCH. The specific duration of the first time range may be preset by the terminal device, or may be configured by the network device to the terminal device, or may be formulated in a protocol, or may be calculated by the terminal device, or may be calculated by the network device and configured to the terminal device.

Optionally, the terminal device may start or restart a timer having the specific duration at the first moment; and during running of the timer, the terminal device is not expected to receive the second PDSCH or is not expected to receive the first PDCCH.

Optionally, the second time range may be a continuous time range. A start moment of the second time range may be a third moment, and an end moment (or referred to as a tail moment) of the third time range may be a fourth moment after the third moment. A duration between the third moment and the fourth moment may be a target duration. In some embodiments, the target duration of the second time range may be the same as the specific duration of the first time range, or the target duration of the second time range may be longer than the specific duration of the first time range. The second time range may include the third moment, or the second time range may not include the third moment. The second time range may include the fourth moment, or the second time range may not include the fourth moment.

Optionally, the start moment and/or the end moment of the first time range and/or the second time range may be represented by at least one of following: a symbol, a time slot or a subframe. For example, the start moment of the first time range and/or the second time range may be at least one of following: a start symbol, a start time slot or a start subframe; and the end moment of the first time range and/or the second time range may be at least one of following: an end symbol, an end time slot or an end subframe. Exemplarily, the start moment of the first time range and/or the second time range may be a start symbol, and the end moment of the first time range and/or the second time range may be an end symbol.

The method for communication corresponding to a network device is described below.

Figure 9:
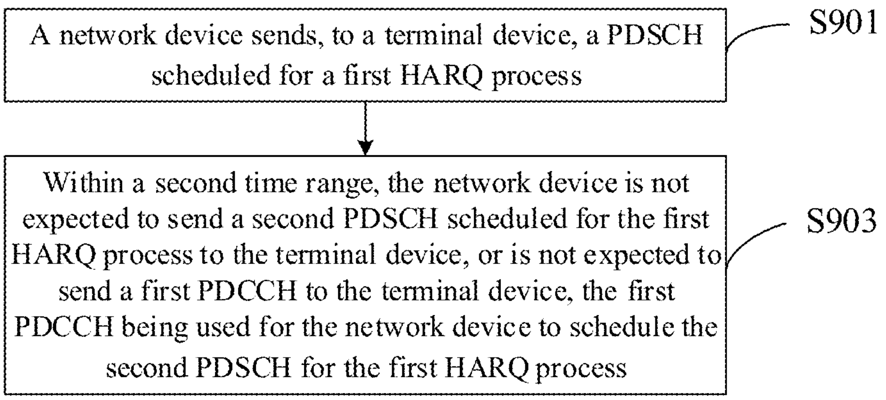
FIG. 9 illustrates a schematic flowchart of a method for communication according to embodiments of the disclosure.

FIG. 9 illustrates a schematic flowchart of a method for communication according to embodiments of the disclosure. As illustrated in FIG. 9, the method includes S901 and S902.

At S901, a network device sends, to a terminal device, a first PDSCH scheduled for a first HARQ process.

In some embodiments, the first PDSCH may be a 1st PDSCH after SPS configuration activation.

In some embodiments, the first PDSCH may be scheduled by a PDCCH.

In some embodiments, the first PDSCH may be an SPS PDSCH corresponding to no PDCCH.

At S903, within a second time range, the network device is not expected to send a second PDSCH scheduled for the first HARQ process to the terminal device, or is not expected to send a first PDCCH to the terminal device, the first PDCCH being used for the network device to schedule the second PDSCH for the first HARQ process.

The event that the network device is not expected to send a second PDSCH scheduled for the first HARQ process to the terminal device, or is not expected to send a first PDCCH to the terminal device may include following two situations.

First situation includes: in a case that the network device sends the first PDSCH to the terminal device, within the second time range, the network device does not send the second PDSCH scheduled for the first HARQ process to the terminal device, or does not send the first PDCCH to the terminal device. Start of the second time range may be end of sending of the first PDSCH. As such, the event that the network device is not expected to send a second PDSCH scheduled for the first HARQ process to the terminal device, or is not expected to send a first PDCCH to the terminal device in S903 may include: the network device does not send the second PDSCH scheduled for the first HARQ process to the terminal device, or does not send the first PDCCH to the terminal device.

Second situation includes: in a case that the network device sends the first PDSCH to the terminal device, within the second time range, the network device may send the second PDSCH scheduled for the first HARQ process to the terminal device, or send the first PDCCH to the terminal device, but the terminal device does not receive the second PDSCH or the first PDCCH under the conditions of monitoring or detecting the second PDSCH or the first PDCCH. The network device may send the second PDSCH or the first PDCCH to the terminal device in the second time range based on pre-configuration or protocol formulation. As such, the event that the network device is not expected to send a second PDSCH scheduled for the first HARQ process to the terminal device, or is not expected to send a first PDCCH to the terminal device in S903 may include: the network device sends the second PDSCH scheduled for the first HARQ process to the terminal device, or does not send the first PDCCH to the terminal device, but the network device is not expected to receive third HARQ-ACK feedback information corresponding to the second PDSCH. That is to say, in the case that the network device sends the second PDSCH or the first PDCCH to the terminal device, the terminal device does not receive the second PDSCH or the first PDCCH, so that the terminal device does not send third HARQ-ACK feedback information corresponding to the second PDSCH to the network device and the network device can receive no third HARQ-ACK feedback information corresponding to the second PDSCH.

In some embodiments, the second time range may start at end of sending of the first PDSCH. In some embodiments, the second time range may end at end of transmission, from the terminal device to the network device, of first HARQ-ACK feedback information corresponding to the first PDSCH.

Optionally, the end of the transmission of the HARQ-ACK feedback information may be determined based on an uplink time sequence of the network device.

In some embodiments, the second time range may start at end of sending of the first PDSCH. In some embodiments, end of the second time range may be end of transmission, from the terminal device to the network device, of first HARQ-ACK feedback information corresponding to the first PDSCH.

Optionally, the end of the transmission of the HARQ-ACK feedback information may be determined based on an uplink time sequence of the terminal device.

In some embodiments, the first HARQ process may be configured with disabled HARQ-ACK feedback, or the first HARQ process may be configured with enabled HARQ-ACK feedback.

The first time range corresponding to a case that the second HARQ process is configured with disabled HARQ-ACK feedback or enabled HARQ-ACK is described below by way of example respectively.

In some embodiments, in the case that the first HARQ process is configured with disabled HARQ-ACK feedback, the second time range may start at end of sending of the first PDSCH, and the second time range may end at end of transmission to the network device receiving from the terminal device of first HARQ-ACK feedback information corresponding to the first PDSCH.

Exemplarily, in the case that the first HARQ process is configured with disabled HARQ-ACK feedback, regardless of if the terminal device is configured with enabled HARQ-ACK feedback corresponding to SPS configuration activation, the second time range starts at end of sending of the first PDSCH, and the second time range ends at end of transmission to the network device from the terminal device of first HARQ HARQ-ACK feedback information corresponding to the first PDSCH.

In some embodiments, in the case that the first HARQ process is configured with enabled HARQ-ACK feedback, the second time range may start at end of sending of the first PDSCH, and the second time range may end at end of transmission to the network device receiving from the terminal device of first HARQ-ACK feedback information corresponding to the first PDSCH.

Exemplarily, in the case that the first HARQ process is configured with enabled HARQ-ACK feedback, regardless of if the terminal device is configured with enabled HARQ-ACK feedback corresponding to SPS configuration activation, the second time range starts at end of sending of the first PDSCH, and the second time range ends at end of the transmission to the network device from the terminal device of the first HARQ-ACK feedback information corresponding to the first PDSCH.

In some embodiments, not only whether the first HARQ process is configured with enabled HARQ-ACK feedback or disabled HARQ-ACK feedback needs to be considered, but also whether the terminal device is configured with enabled HARQ-ACK feedback corresponding to SPS configuration activation or not needs to be considered.

In some embodiments, if the network device configures the terminal device with enabled HARQ-ACK feedback corresponding to SPS configuration activation, and the first HARQ process is configured with enabled HARQ-ACK feedback, the second time range may start at end of sending of the first PDSCH, and the second time range may end at end of the transmission to the network device from the terminal device of the first HARQ-ACK feedback information corresponding to the first PDSCH.

In some other embodiments, if the network device configures the terminal device with enabled HARQ-ACK feedback corresponding to SPS configuration activation, and the first HARQ process is configured with disabled HARQ-ACK feedback, the second time range may start at end of sending of the first PDSCH, and the second time range may end at end of the transmission to the network device from the terminal device of the first HARQ-ACK feedback information corresponding to the first PDSCH.

In some other embodiments, if the network device does not configure the terminal device with enabled HARQ-ACK feedback corresponding to SPS configuration activation, and the first HARQ process is configured with enabled HARQ-ACK feedback, the second time range may start at end of sending of the first PDSCH, and the second time range may end at end of the transmission to the network device from the terminal device of the first HARQ-ACK feedback information corresponding to the first PDSCH.

In some other embodiments, if the first PDSCH corresponds to first HARQ-ACK feedback, the second time range may start at end of sending of the first PDSCH, and the second time range may end at end of the transmission to the network device from the terminal device of the first HARQ-ACK feedback information corresponding to the first PDSCH.

In some embodiments, the time sequence for the transmission of the first HARQ-ACK feedback information from the terminal device to the network device may be determined according to at least one of following: a set of HARQ feedback time sequences, an offset value Koffset, or an HARQ feedback timing value K1.

In some embodiments, the second time range may start at end of sending of the first PDSCH. A duration corresponding to the second time range may be a first duration. The first duration may be the above T_proc, 1.

In some embodiments, the first HARQ process may be configured with disabled HARQ-ACK feedback, or the first HARQ process may be configured with enabled HARQ-ACK feedback.

The first time range corresponding to that the second HARQ process may be configured with disabled HARQ-ACK feedback or enabled HARQ-ACK is described below by way of example respectively.

In some embodiments, in the case that the first HARQ process is configured with disabled HARQ-ACK feedback, the second time range may start at end of sending of the first PDSCH, and a duration corresponding to the second time range may be a first duration.

Exemplarily, in the case that the first HARQ process is configured with disabled HARQ-ACK feedback, regardless of if the terminal device is configured with enabled HARQ-ACK feedback corresponding to SPS configuration activation, the second time range may start at end of sending of the first PDSCH, and a duration corresponding to the second time range may be a first duration.

In some embodiments, in the case that the first HARQ process is configured with enabled HARQ-ACK feedback, the second time range may start at end of sending of the first PDSCH; and a duration corresponding to the second time range may be a first duration.

Exemplarily, in the case that the first HARQ process is configured with enabled HARQ-ACK feedback, regardless of if the terminal device is configured with enabled HARQ-ACK feedback corresponding to SPS configuration activation, the second time range may start at end of sending of the first PDSCH, and a duration corresponding to the second time range may be a first duration.

In some embodiments, not only whether the first HARQ process is configured with enabled HARQ-ACK feedback or disabled HARQ-ACK feedback needs to be considered, but also whether the terminal device is configured with enabled HARQ-ACK feedback corresponding to SPS configuration activation or not needs to be considered.

In some embodiments, if the network device does not configure the terminal device with enabled HARQ-ACK feedback corresponding to SPS configuration activation and the first HARQ process is configured with disabled HARQ-ACK feedback, the second time range may start at end of sending of the first PDSCH; and a duration corresponding to the second time range may be a first duration.

In some other embodiments, if the first PDSCH corresponds to no HARQ-ACK feedback, the second time range may start at end of sending of the first PDSCH; and a duration corresponding to the second time range may be a first duration.

In some embodiments, if the network device configures the terminal device with enabled HARQ-ACK feedback corresponding to SPS configuration activation, and the first HARQ process is configured with disabled HARQ-ACK feedback, or if the network device does not configure the terminal device with enabled HARQ-ACK feedback corresponding to SPS configuration activation, and the first HARQ process is configured with enabled HARQ-ACK feedback, the second time range may start at end of sending of the first PDSCH; and a duration corresponding to the second time range may be a first duration.

In some embodiments, the first duration may be determined according to at least one of following: a processing capability of the terminal device, a subcarrier spacing, or a decoding duration for the first PDSCH.

In some embodiments, the event that the network device is not expected to send, to the terminal device, the second PDSCH scheduled for the first HARQ process may include: when the network device sends, to the terminal device within the second time range, the second PDSCH scheduled for the first HARQ process, the network device refrains from receiving the second PDSCH.

In some embodiments, the event that the network device does not to send the first PDCCH to the terminal device may include: when the network device sends the first PDCCH to the terminal device within the second time range, the network device refrains from receiving the second PDSCH.

Optionally, the event that the network device does not receive the third HARQ-ACK feedback information corresponding to the second PDSCH may be the case that the network device receives no HARQ-ACK feedback information corresponding to the second PDSCH. The network device may receive no HARQ-ACK feedback information corresponding to the second PDSCH at any time after sending the second PDSCH or the first PDCCH to the terminal device.

In some embodiments, the second PDSCH may be scheduled by a PDCCH.

In some embodiments, the second PDSCH may be an SPS PDSCH corresponding to no PDCCH.

In some embodiments, the method may further include that:

- in a case that a second HARQ process is configured with enabled HARQ-ACK feedback, the network device sends to the terminal device a third PDSCH scheduled for the second HARQ process, the third PDSCH being an SPS PDSCH corresponding to no PDCCH; and
- from end of sending of the third PDSCH to end of transmission to the network device from the terminal device of second HARQ-ACK feedback information corresponding to the third PDSCH, the network device is not expected to send a fourth PDSCH scheduled for the second HARQ process, or is not expected to send a second PDCCH to the terminal device, the second PDCCH being used for the network device to schedule the fourth PDSCH for the second HARQ process.

In some embodiments, the method may further include that:

in a case that a second HARQ process is configured with disabled HARQ-ACK feedback, the network device sends to the terminal device a third PDSCH scheduled for the second HARQ process, the third PDSCH being an SPS PDSCH corresponding to no PDCCH; and from end of sending of the third PDSCH to end of a second duration, the network device is not expected to send a fourth PDSCH scheduled for the second HARQ process, or is not expected to send a second PDCCH to the terminal device, the second PDCCH being used for the network device to schedule the fourth PDSCH for the second HARQ process.

In some embodiments, the first duration and the second duration may be the same.

In some embodiments, the first time range and the second time range may be the same.

Some embodiments of the method for communication of the disclosure are described hereinafter.

It is to be noted that, in the following embodiments, the first HARQ process is an HARQ process corresponding to a 1st SPS PDSCH after the SPS configuration activation. The second HARQ process is an HARQ process corresponding to at least one SPS PDSCH other than the 1st SPS PDSCH after the SPS configuration activation.

In some embodiments, in a case that the network device enables the HARQ-ACK feedback corresponding to SPS configuration activation through RRC signaling, a scheduling constraint for the first HARQ process may satisfy:

if the terminal device receives a first PDSCH scheduled for a first HARQ process from a network device, the terminal device is not expected to receive a second PDSCH scheduled for the first HARQ process from the network device before the terminal device receives first HARQ-ACK feedback information corresponding to the first PDSCH from the network device; or the terminal device is not expected to receive a PDCCH (i.e., the first PDCCH above) corresponding to the second PDSCH scheduled for the first HARQ process from the network device. A time sequence for the transmission of the first HARQ-ACK feedback information from the terminal device to the network device may be determined according to at least one of following: a set of HARQ feedback time sequences, an offset value Koffset or an HARQ feedback timing value K1. The set of HARQ feedback time sequences may be preset or may be configured by the network device. The HARQ feedback timing value K1 may be a value in the set of HARQ feedback time sequences.

In a feasible implementation of the embodiment, the first HARQ process may be configured with disabled HARQ-ACK feedback.

In a feasible implementation of the embodiment, the first HARQ process may be configured with enabled HARQ-ACK feedback.

In a feasible implementation of the embodiment, the first PDSCH may be scheduled by a PDCCH, and the second PDSCH may be not scheduled by a PDCCH.

In a feasible implementation of the embodiment, the first PDSCH may be not scheduled by a PDCCH, and the second PDSCH may be scheduled by a PDCCH.

In a feasible implementation of the embodiment, the first PDSCH may be scheduled by a PDCCH, and the second PDSCH may be scheduled by a PDCCH.

In a feasible implementation of the embodiment, the first PDSCH may be not scheduled by a PDCCH, and the second PDSCH may be not scheduled by a PDCCH.

Figure 10:
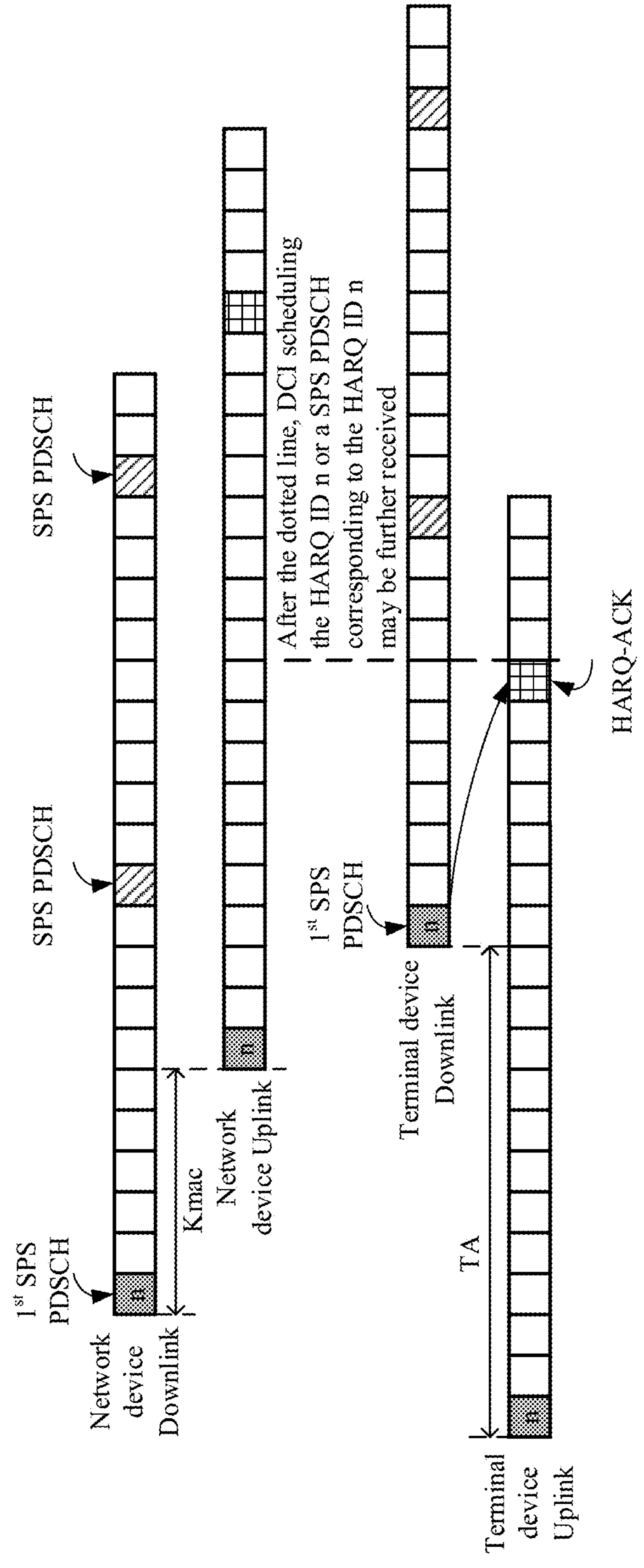
FIG. 10 illustrates a schematic diagram of a scheduling constraint for a first HARQ process according to embodiments of the disclosure.

FIG. 10 illustrates a schematic diagram of a scheduling constraint for a first HARQ process according to embodiments of the disclosure. As illustrated in FIG. 10, the network device may send to the terminal device a 1st SPS PDSCH that follows SPS configuration activation, and another SPS PDSCH other than the 1st SPS PDSCH. The 1st SPS PDSCH may be scheduled for the first HARQ process (HARQ ID n). In the case of receiving the 1st SPS PDSCH, the terminal device may send HARQ-ACK feedback information corresponding to the 1st PDSCH to the network device. In some embodiments, the 1st PDSCH may be the first PDSCH above. Within a time range from end of reception of the 1st SPS PDSCH to end of the sending of the HARQ-ACK feedback information, the terminal device is not expected to receive another PDSCH scheduled for the first HARQ process. After a time corresponding to a dotted line in FIG. 10, the terminal device may further receive DCI scheduling the HARQ ID n, or may further receive a SPS PDSCH corresponding to the HARQ ID n.

In some embodiments, in a case that the network device enables the HARQ-ACK feedback corresponding to SPS configuration activation through RRC signalling, a scheduling constraint for the first HARQ process may satisfy:

when the first HARQ process is configured with enabled HARQ-ACK, if the terminal device receives a first PDSCH scheduled for a first HARQ process from a network device, the terminal device is not expected to receive a second PDSCH scheduled for the first HARQ process from the network device or the terminal device is not expected to receive a PDCCH corresponding to the second PDSCH scheduled by the network device for the first HARQ process, before the terminal device receives first HARQ-ACK feedback information corresponding to the first PDSCH from the network device. A time sequence for the transmission of the first HARQ-ACK feedback information from the terminal device to the network device is determined according to at least one of following: a set of HARQ feedback time sequences, an offset value Koffset or an HARQ feedback timing value K1. The set of HARQ feedback time sequences may be preset or may be configured by the network device. The HARQ feedback timing value K1 is a value of the set of HARQ feedback time sequences; and/or when the first HARQ process is configured with disabled HARQ-ACK, if the terminal device receives a first PDSCH scheduled for the first HARQ process from the network device, the terminal device is not expected to receive a first PDCCH corresponding to a second PDSCH scheduled by the network device for the first HARQ process, or the terminal device is not expected to receive a second PDSCH transmitted by the network device using the first HARQ process from end of reception of the first PDSCH to end of a first duration.

In a feasible implementation of the embodiment, the first PDSCH may be scheduled by a PDCCH, and the second PDSCH may be not scheduled by a PDCCH.

In a feasible implementation of the embodiment, the first PDSCH may be scheduled by a PDCCH, and the second PDSCH may be scheduled by a PDCCH.

In a feasible implementation of the embodiment, the first PDSCH may be scheduled by a PDCCH, and the second PDSCH may be scheduled by a PDCCH.

In a feasible implementation of the embodiment, the first PDSCH may be not scheduled by a PDCCH, and the second PDSCH may be not scheduled by a PDCCH.

Figure 11:
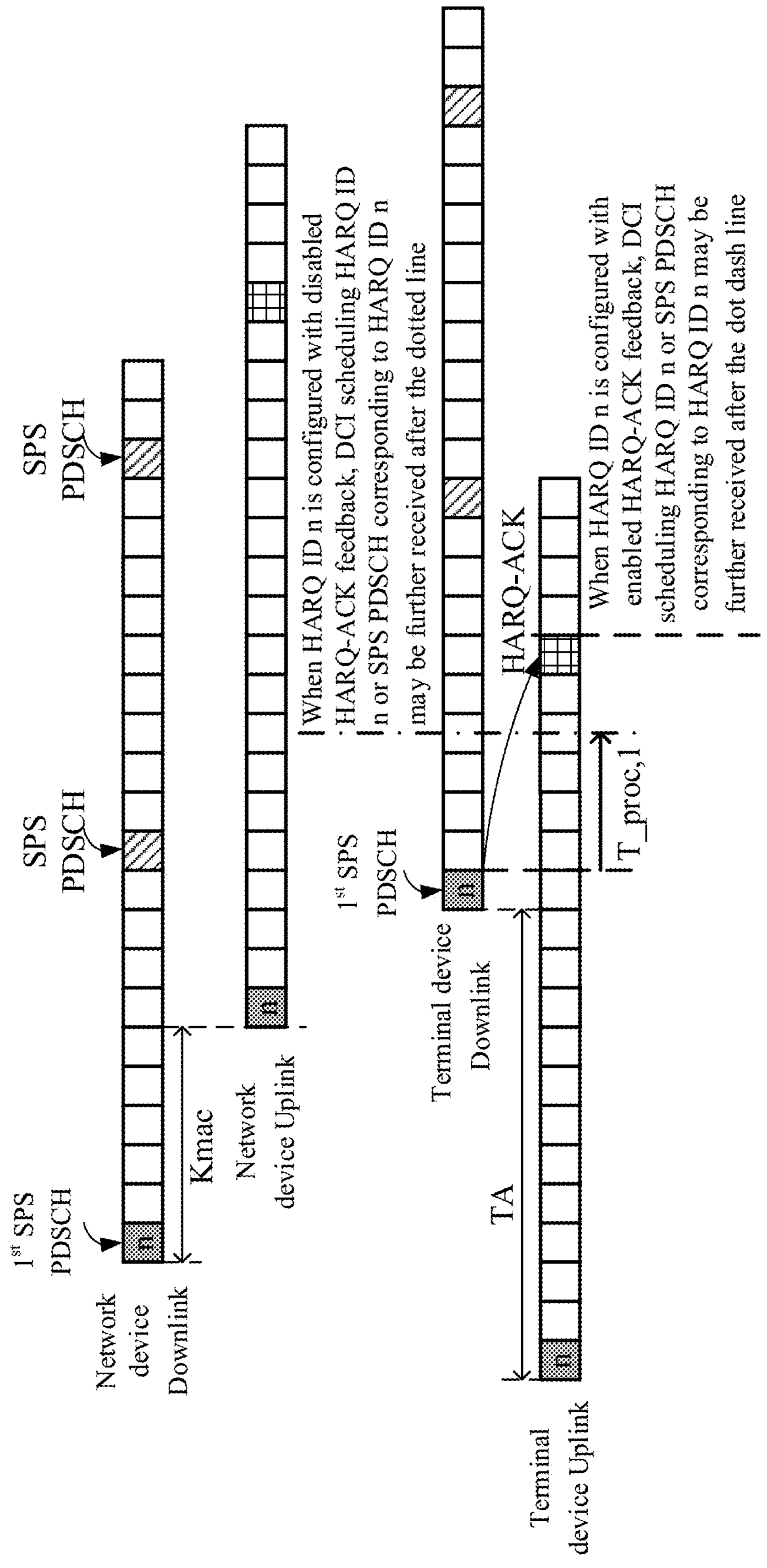
FIG. 11 illustrates a schematic diagram of another scheduling constraint for the first HARQ process according to embodiments of the disclosure.

FIG. 11 illustrates a schematic diagram of another scheduling constraint for the first HARQ process according to embodiments of the disclosure. As illustrated in FIG. 11, the network device may send to the terminal device a 1st SPS PDSCH that follows SPS configuration activation as well as another SPS PDSCH other than the 1st SPS PDSCH. The 1st SPS PDSCH may be scheduled for the first HARQ process (HARQ ID n).

When the first HARQ process is configured with enabled HARQ-ACK, in the case of receiving the $1^{st}$ SPS PDSCH, the terminal device may send HARQ-ACK feedback information corresponding to the $1^{st}$ PDSCH to the network device. In some embodiments, the $1^{st}$ PDSCH may be the first PDSCH above. Within a time range from end of reception of the $1^{st}$ SPS PDSCH to end of sending of the HARQ-ACK feedback information, the terminal device is not expected to receive another PDSCH scheduled for the first HARQ process. That is to say, when the HARQ ID n is configured with enabled HARQ-ACK feedback, DCI scheduling the HARQ ID n or an SPS PDSCH corresponding to the HARQ ID n may be further received after the dotted line.

When the first HARQ process is configured with disabled HARQ-ACK, in the case of receiving the $1^{st}$ SPS PDSCH, the terminal device may not send HARQ-ACK feedback information corresponding to the $1^{st}$ PDSCH to the network device. Within a time range with a first duration T_proc, 1 starting from end of reception of the $1^{st}$ SPS PDSCH, the terminal device is not expected to receive another PDSCH scheduled for the first HARQ process. That is to say, when the HARQ ID n is configured with enabled HARQ-ACK feedback, DCI scheduling the HARQ ID n or an SPS PDSCH corresponding to the HARQ ID n may be further received after the dot dash line.

In some embodiments, in a case that the network device enables the HARQ-ACK feedback corresponding to SPS configuration activation through RRC signaling, a scheduling constraint for the first HARQ process may satisfy:

if the terminal device receives a first PDSCH scheduled for a first HARQ process from a network device, the terminal device is not expected to further receive a first PDCCH corresponding to a second PDSCH scheduled by the network device for the first HARQ process, or the terminal device is not expected to further receive a second PDSCH transmitted by the network device using the first HARQ process from end of reception of the first PDSCH to end of a first duration.

In a feasible implementation of the embodiment, the first HARQ process may be configured with disabled HARQ-ACK feedback.

In a feasible implementation of the embodiment, the first HARQ process may be configured with enabled HARQ-ACK feedback.

In a feasible implementation of the embodiment, the first PDSCH may be scheduled by a PDCCH, and the second PDSCH may be not scheduled by a PDCCH.

In a feasible implementation of the embodiment, the first PDSCH may be not scheduled by a PDCCH, and the second PDSCH may be scheduled by a PDCCH.

In a feasible implementation of the embodiment, the first PDSCH may be scheduled by a PDCCH, and the second PDSCH may be scheduled by a PDCCH.

In a feasible implementation of the embodiment, the first PDSCH may be not scheduled by a PDCCH, and the second PDSCH may be not scheduled by a PDCCH.

Figure 12:
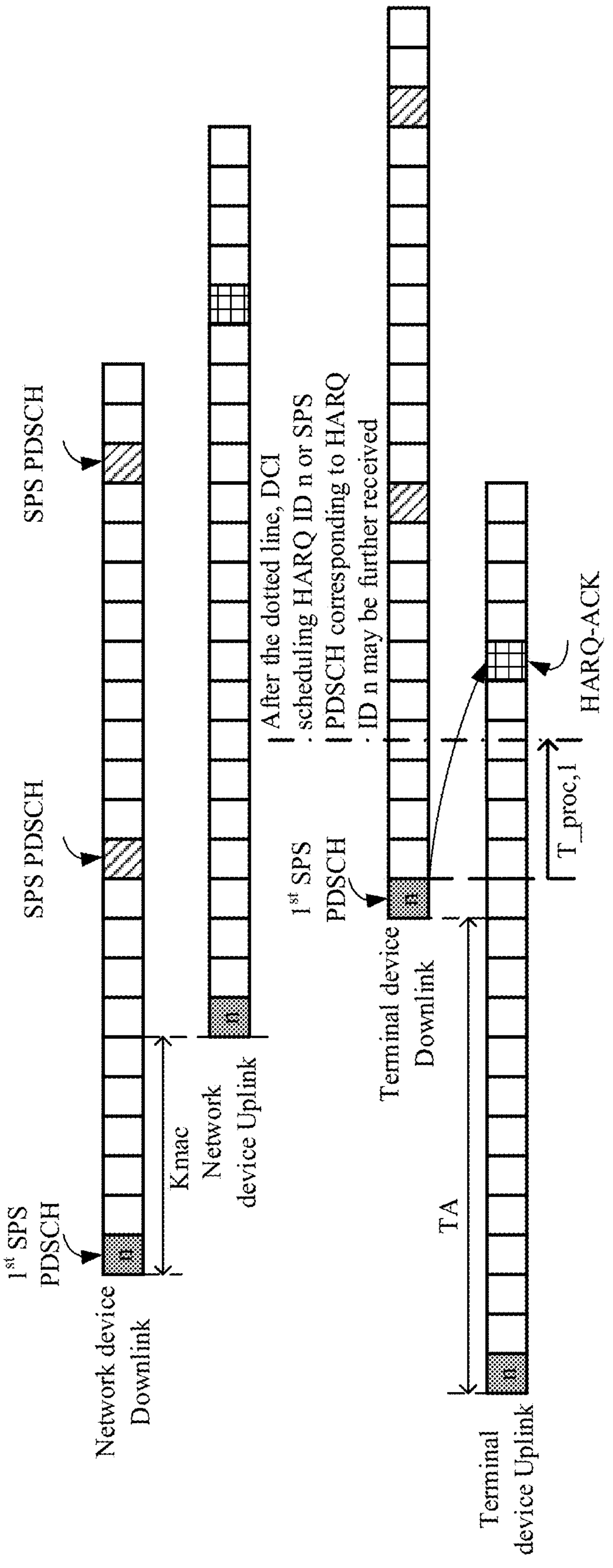
FIG. 12 illustrates a schematic diagram of yet another scheduling constraint for the first HARQ process according to embodiments of the disclosure.

FIG. 12 illustrates a schematic diagram of yet another scheduling constraint for the first HARQ process according to embodiments of the disclosure. As illustrated in FIG. 12, the network device may send to the terminal device a 1st SPS PDSCH that follows SPS configuration activation as well as another SPS PDSCH other than the 1st SPS PDSCH. The 1st SPS PDSCH may be scheduled for the first HARQ process (HARQ ID n).

In the case of receiving the $1^{st}$ SPS PDSCH, the terminal device may not send HARQ-ACK feedback information corresponding to the $1^{st}$ PDSCH to the network device. Within a time range with a first duration T_proc, 1 starting from end of reception of the $1^{st}$ SPS PDSCH, the terminal device is not expected to receive another PDSCH scheduled for the first HARQ process. After a time corresponding to a dot dash line in FIG. 12, the terminal device may further receive DCI scheduling the HARQ ID n, or may further receive a SPS PDSCH corresponding to the HARQ ID n.

In some embodiments, in a case that the network device does not enable the HARQ-ACK feedback corresponding to SPS configuration activation through RRC signaling:

when the first HARQ process is configured with enabled HARQ-ACK feedback, a scheduling constraint for the first HARQ process may satisfy:

if the terminal device receives a first PDSCH scheduled for a first HARQ process from a network device, the terminal device is not expected to further receive a second PDSCH scheduled for the first HARQ process from the network device, or the terminal device is not expected to further receive a PDCCH corresponding to the PDSCH scheduled by the network device for the first HARQ process, before the terminal device receives first HARQ-ACK feedback information corresponding to the first PDSCH from the network device. A time sequence for the transmission of the first HARQ-ACK feedback information from the terminal device to the network device is determined according to at least one of following: a set of HARQ feedback time sequences, an offset value Koffset or an HARQ feedback timing value K1. The set of HARQ feedback time sequences may be preset or may be configured by the network device. The HARQ feedback timing value K1 is a value in the set of HARQ feedback time sequences.

When the first HARQ process is configured with disabled HARQ-ACK feedback, a scheduling constraint for the first HARQ process may satisfy:

if the terminal device receives a first PDSCH scheduled for the first HARQ process from the network device, the terminal device is not expected to further receive a first PDCCH corresponding to a second PDSCH scheduled by the network device for the first HARQ process, or the terminal device is not expected to further receive the second PDSCH transmitted by the network device using the first HARQ process from end of reception of the first PDSCH to end of a first duration. The first duration may have a length of T_proc, 1.

In a feasible implementation of the embodiment, the first PDSCH may be scheduled by a PDCCH, and the second PDSCH may be not scheduled by a PDCCH.

In a feasible implementation of the embodiment, the first PDSCH may be not scheduled by a PDCCH, and the second PDSCH may be scheduled by a PDCCH.

In a feasible implementation of the embodiment, the first PDSCH may be scheduled by a PDCCH, and the second PDSCH may be scheduled by a PDCCH.

In a feasible implementation of the embodiment, the first PDSCH may be not scheduled by a PDCCH, and the second PDSCH may be not scheduled by a PDCCH.

Embodiments of the disclosure further provide a method for communication with a scheduling constraint for a first HARQ process.

When the second HARQ process is configured with enabled HARQ-ACK feedback, a scheduling constraint for the second HARQ process may satisfy:

if the terminal device receives a third PDSCH scheduled by a network device for the second HARQ process, the terminal device is not expected to further receive a fourth PDSCH scheduled for the second HARQ process from the network device or the terminal device is not expected to further receive a PDCCH (namely, the second PDCCH above) corresponding to the fourth PDSCH scheduled by the network device for the second HARQ process until the end of transmission, from the terminal device to the network device, of second HARQ-ACK feedback information corresponding to the third PDSCH. A time sequence for transmission, from the terminal device to the network device, of the second HARQ-ACK feedback information is determined according to at least one of: a set of HARQ feedback time sequences, an offset value Koffset or an HARQ feedback timing value K1. The set of HARQ feedback time sequences may be preset or may be configured by the network device. The HARQ feedback timing value K1 is a value of the set of HARQ feedback time sequences. For example, the time sequence for transmission, from the terminal device to the network device, of the second HARQ-ACK feedback information may be determined according to a set of HARQ feedback time sequences, an offset value Koffset, or an HARQ feedback timing value K1. The HARQ feedback timing value K1 may be carried by a PDCCH, and may be a value in the set of HARQ feedback time sequences. The offset value Koffset may be configured by the network device.

When the second HARQ process is configured with disabled HARQ-ACK feedback, a scheduling constraint for the second HARQ process may satisfy:

if the terminal device receives a third PDSCH scheduled by a network device for the second HARQ process, from end of reception of the third PDSCH to end of a second duration, the terminal device is not expected to further receive a second PDCCH corresponding to a fourth PDSCH scheduled by the network device for the second HARQ process or the terminal device is not expected to further receive the fourth PDSCH transmitted by the network device using the second HARQ process. The second duration has a length of T_proc, 1. In some embodiments, the second duration may be the same as the first duration, or the second duration may be different from the first duration. The second duration may be determined according to at least one of following: a processing capability of the terminal device, a subcarrier spacing, or a decoding duration for the first PDSCH.

In a feasible implementation of the embodiment, the third PDSCH may be not scheduled by a PDCCH, and/or the fourth PDSCH may be not scheduled by a PDCCH.

Embodiments of the disclosure further provide a method for communication with a scheduling constraint for an HARQ process needing HARQ-ACK feedback information.

A scheduling constraint for the HARQ process needing HARQ-ACK feedback information are as following:

for a first HARQ process with HARQ-ACK information expected to be provided by a terminal device, if the terminal device receives a first PDSCH scheduled by a network device for the first HARQ process, the terminal device is not expected to further receive a second PDSCH scheduled for the first HARQ process from the network device or the terminal device is not expected to further receive a PDCCH corresponding to the PDSCH transmitted by the network device by scheduling the first HARQ process until the terminal device sends first HARQ-ACK feedback information corresponding to the first PDSCH to the network device. A time sequence for the transmission of the first HARQ-ACK feedback information from the terminal device to the network device is determined according to at least one of following: a set of HARQ feedback time sequences, an offset value Koffset or an HARQ feedback timing value K1. The set of HARQ feedback time sequences may be preset or may be configured by the network device. The HARQ feedback timing value K1 is a value of the set of HARQ feedback time sequences.

Embodiments of the disclosure further provide a method for communication with a scheduling constraint for an HARQ process that needs no HARQ-ACK feedback information.

A scheduling constraint for the HARQ process needing no HARQ-ACK feedback information are as following:

for a first HARQ process with no HARQ-ACK information expected to be provided by a terminal device, if the terminal device receives a first PDSCH scheduled by a network device for a second HARQ process, from end of reception of the first PDSCH to end of a first duration, the terminal device is not expected to further receive a first PDCCH corresponding to a second PDSCH scheduled by the network device for the second HARQ process or the terminal device is not expected to further receive the second PDSCH transmitted by the network device using the second HARQ process.

Embodiments of the disclosure further provide a method for communication with a scheduling constraint for a first HARQ process corresponding to a first SPS PDSCH.

Figure 13:
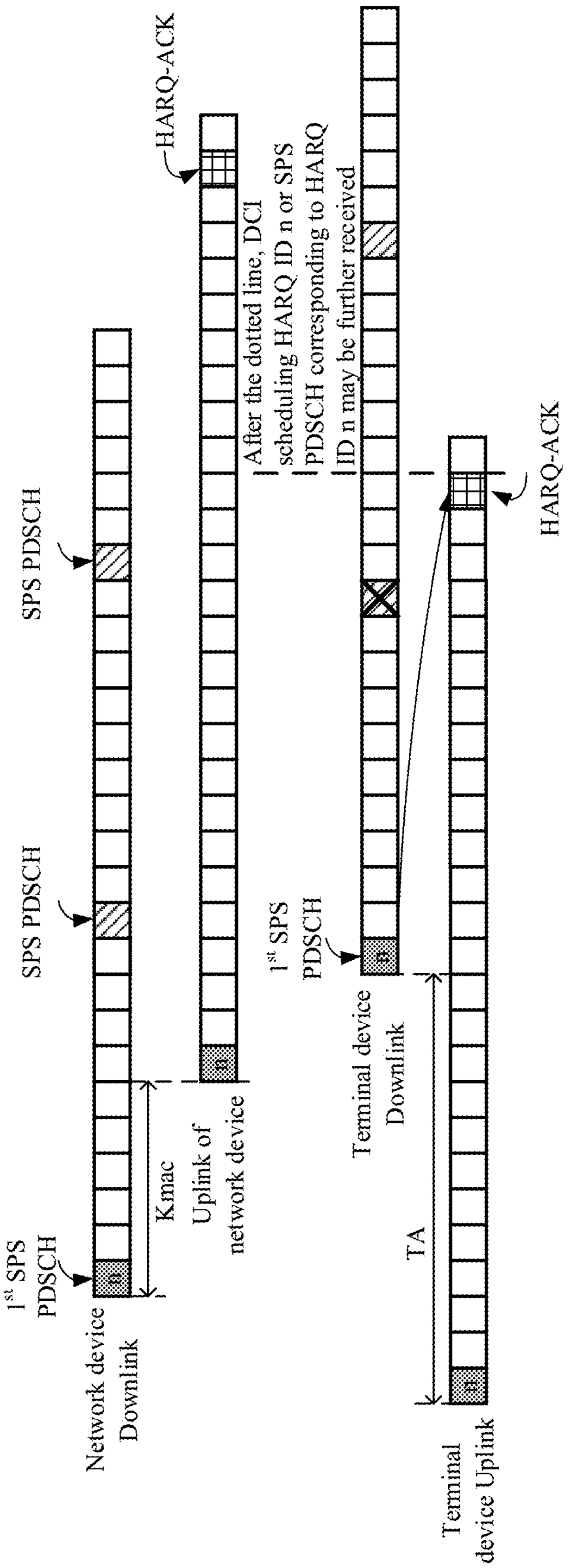
FIG. 13 illustrates a schematic diagram of another scheduling constraint for the first HARQ process according to embodiments of the disclosure.

FIG. 13 illustrates a schematic diagram of another scheduling constraint for the first HARQ process according to embodiments of the disclosure. As illustrated in FIG. 13, the network device may send to the terminal device a 1st SPS PDSCH that follows SPS configuration activation as well as another SPS PDSCH other than the 1st SPS PDSCH. The 1st SPS PDSCH may be scheduled for the first HARQ process (HARQ ID n).

In case that the first HARQ process corresponding to the first SPS PDSCH needs HARQ-ACK feedback, a scheduling constraint for the first HARQ process may satisfy: if the terminal device receives the first SPS PDSCH scheduled by the network device for the first HARQ process, the terminal device is not expected to further receive a second PDSCH scheduled for the first HARQ process from the network device until the terminal device sends first HARQ-ACK feedback information corresponding to the first SPS PDSCH to the network device. When the terminal device is configured to use the first HARQ process to receive an SPS PDSCH before the end of transmission of the first HARQ- ACK feedback information, the terminal device may not receive the SPS PDSCH. After a dotted line in FIG. 13, the terminal device may further receive DCI scheduling the HARQ ID n, or may further receive a SPS PDSCH corresponding to the HARQ ID n.

By means of the method for communication according to embodiments of the disclosure, for the first HARQ process used to transmit the $1^{st}$ SPS PDSCH, a scheduling constraint for the $1^{st}$ SPS PDSCH and an SPS PDSCH other than the $1^{st}$ SPS PDSCH may be normalized, thus avoiding the terminal device from being out of order when receiving PDSCHs and/of DCI.

Preferred implementations of the disclosure are described in detail in conjunction with accompanying drawings. However, the disclosure is not limited to the particular details in the above implementations. Within the range of the technical idea of the disclosure, multiple simple variations can be made to the technical solutions of the disclosure, and these variations all fall within the scope of protection of the disclosure. For example, the particular technical features described in the above particular implementations may be combined in any suitable way without conflict. To avoid unnecessary repetition, the possible combinations are not described in the disclosure. For example, different implementations of the disclosure may also be combined arbitrarily without departing from the concept of the disclosure, which shall be considered as content disclosed by the disclosure as well. For another, without conflict, the various embodiments described in the disclosure and/or technical features of the various embodiments may be combined with the related art arbitrarily, and the technical solutions obtained via the combination shall also fall within the scope of protection of the disclosure.

It is also to be understood that, in the method embodiments of the disclosure, the sizes of the serial numbers of the above operations do not imply the sequential order in which the operations are performed, and shall not construe any limitation to the implementation of the embodiments of the disclosure. The order in which the operations are performed should be decided by their functions and internal logics. In addition, in the embodiments of the disclosure, the terms “downlink”, “uplink” and “sidelink” are used for representing the transmission direction of signals or data. “Downlink” is used for representing the transmission direction of signals or data is a first direction of sending from a station to user equipment in a cell. “Uplink” is used for representing the transmission direction of signals or data is a second direction of sending from user equipment in a cell to a station. “Sidelink” is used for representing the transmission direction of signals or data is a third direction of sending from user equipment 1 to user equipment 2. For example, “downlink signal” represents that the transmission signal of the direction is the first signal. In addition, in the embodiments of the disclosure, the term “and/or” herein merely describes a relation between associated objects, representing that three relations may exist. In particular, A and/or B may represent following three cases: existence of A alone, existence of both A and B, and existence of B alone. The character “/” generally indicates that the contextual objects are in an “or” relationship.

Figure 14:
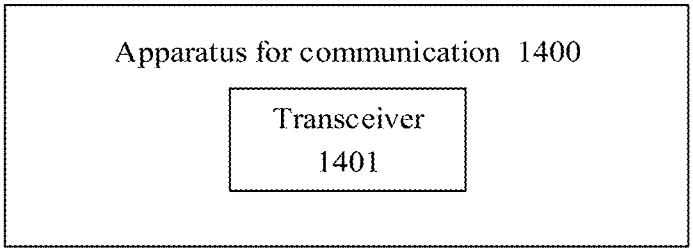
FIG. 14 illustrates a schematic diagram of composition of an apparatus for communication according to embodiments of the disclosure.

FIG. 14 illustrates a schematic diagram of composition of an apparatus for communication according to embodiments of the disclosure. The apparatus may be applied to a terminal device. As illustrated in FIG. 14, the apparatus 1400 for communication includes a transceiver 1401. The transceiver 1401 is configured to receive a first PDSCH scheduled for a first HARQ process from a network device. The transceiver 1401 is further configured to: within a first time range, not expect to receive a second PDSCH scheduled for the first HARQ process from the network device, or not expect to receive a first PDCCH. The first PDCCH is used for the network device to schedule the second PDSCH for the first HARQ process.

In some implementations, the apparatus 1400 for communication may further include a determination unit configured to determine the first time range.

In some embodiments, the first time range may start at end of reception of the first PDSCH, and/or the first time range may end at end of transmission, from the terminal device to the network device, of first HARQ acknowledgement (HARQ-ACK) feedback information corresponding to the first PDSCH.

In some embodiments, a time sequence for the transmission of the first HARQ-ACK feedback information from the terminal device to the network device may be determined according to at least one of following: a set of HARQ feedback time sequences, an offset value Koffset, or an HARQ feedback timing value K1.

In some embodiments, the first time range may start at end of reception of the first PDSCH. A duration corresponding to the first time range may be a first duration.

In some embodiments, the first duration may be determined according to at least one of following: a processing capability of the terminal device, a subcarrier spacing, or a decoding duration for the first PDSCH.

In some embodiments, the first HARQ process may be configured with disabled HARQ-ACK feedback, or the first HARQ process may be configured with enabled HARQ-ACK feedback.

In some embodiments, the terminal device may be configured to enable the HARQ-ACK feedback corresponding to SPS configuration activation, and the first HARQ process may be configured with enabled HARQ-ACK feedback; or the terminal device may be configured to enable the HARQ-ACK feedback corresponding to SPS configuration activation, and the first HARQ process may be configured with disabled HARQ-ACK feedback; or the terminal device may be not configured to enable the HARQ-ACK feedback corresponding to SPS configuration activation, and the first HARQ process may be configured with enabled HARQ-ACK feedback; or the first PDSCH may correspond to first HARQ-ACK feedback.

In some embodiments, the terminal device may be not configured to enable the HARQ-ACK feedback corresponding to SPS configuration activation, and the first HARQ process may be configured with disabled HARQ-ACK feedback; or the first PDSCH may not correspond to first HARQ-ACK feedback.

In some embodiments, the first PDSCH may be a 1st PDSCH after SPS configuration activation; or the first PDSCH may be scheduled by a PDCCH; or the first PDSCH may be an SPS PDSCH corresponding to no PDCCH.

In some embodiments, the transceiver 1401 is further configured to: refrain from receiving the second PDSCH when the terminal device is scheduled by the network device to use the first HARQ process to receive the second PDSCH within the first time range.

The transceiver 1401 is further configured to: refrain from receiving the first PDCCH when the terminal device is scheduled by the network device to receive the first PDCCH within the first time range.

In some embodiments, the second PDSCH may be scheduled by a PDCCH, or the second PDSCH may be an SPS PDSCH corresponding to no PDCCH.

In some embodiments, the transceiver 1401 is further configured to: receive a third PDSCH scheduled for the second HARQ process from the network device, in a case that the second HARQ process is configured with enabled HARQ-ACK feedback. The third PDSCH may be an SPS PDSCH corresponding to no PDCCH. The transceiver 1401 is further configured to: from end of reception of the third PDSCH to end of transmission to the network device from the terminal device of second HARQ-ACK feedback information corresponding to the third PDSCH, not expect to receive a fourth PDSCH scheduled for the second HARQ process from the network device, or not expect to receive a second PDCCH. The second PDCCH is used for the network device to schedule the fourth PDSCH for the second HARQ process.

In some embodiments, the transceiver 1401 is further configured to: receive a third PDSCH scheduled for the second HARQ process from the network device, in a case that the second HARQ process is configured with disabled HARQ-ACK feedback. The third PDSCH may be an SPS PDSCH corresponding to no PDCCH. The transceiver 1401 is further configured to: from end of reception of the third PDSCH to end of a second duration, not expect to receive a fourth PDSCH scheduled for the second HARQ process from the network device, or not expect to receive a second PDCCH. The second PDCCH is used for the network device to schedule the fourth PDSCH for the second HARQ process.

Figure 15:
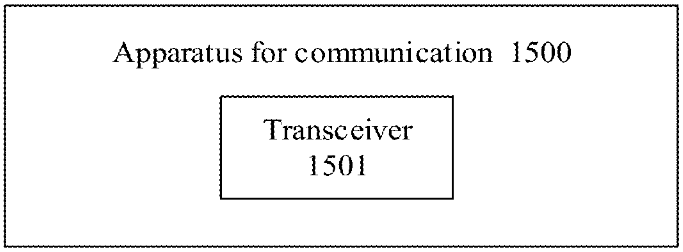
FIG. 15 illustrates a schematic diagram of composition of another apparatus for communication according to embodiments of the disclosure.

FIG. 15 illustrates a schematic diagram of composition of another apparatus for communication according to embodiments of the disclosure. The apparatus may be applied to a network device. As illustrated in FIG. 15, the apparatus 1500 for communication includes a transceiver 1501. The transceiver 1501 is configured to send, to a terminal device, a first PDSCH scheduled for a HARQ process. The transceiver 1501 is further configured to: within a second time range, not expect to send a second PDSCH scheduled for the first HARQ process to the terminal device, or not expect to send a first PDCCH to the terminal device. The first PDCCH is used for scheduling the second PDSCH for the first HARQ process.

In some implementations, the apparatus 1500 for communication may further include a determination unit configured to determine the second time range.

In some embodiments, the second time range may start at end of sending of the first PDSCH; and/or the second time range may end at end of transmission, from the terminal device to the network device, of first HARQ-ACK feedback information corresponding to the first PDSCH.

In some embodiments, a time sequence for the transmission of the first HARQ-ACK feedback information from the terminal device to the network device may be determined according to at least one of following: a set of HARQ feedback time sequences, an offset value Koffset, or an HARQ feedback timing value K1.

In some embodiments, the second time range may start at end of sending of the first PDSCH. A duration corresponding to the second time range may be a first duration.

In some embodiments, the first duration may be determined according to at least one of following: a processing capability of the terminal device, a subcarrier spacing, or a decoding duration for the first PDSCH.

In some embodiments, the first HARQ process may be configured with disabled HARQ-ACK feedback, or the first HARQ process may be configured with enabled HARQ-ACK feedback.

In some embodiments, the network device may configure the terminal device to enable the HARQ-ACK feedback corresponding to SPS configuration activation, and the first HARQ process may be configured with enabled HARQ-ACK feedback; or the network device may configure the terminal device to enable the HARQ-ACK feedback corresponding to SPS configuration activation, and the first HARQ process may be configured with disabled HARQ-ACK feedback; or the network device may not configure the terminal device to enable the HARQ-ACK feedback corresponding to SPS configuration activation, and the first HARQ process may be configured with enabled HARQ-ACK feedback; or the first PDSCH may correspond to first HARQ-ACK feedback.

In some embodiments, the network device may not configure the terminal device to enable the HARQ-ACK feedback corresponding to SPS configuration activation, and the first HARQ process may be configured with disabled HARQ-ACK feedback; or the first PDSCH may not correspond to first HARQ-ACK feedback.

In some embodiments, the first PDSCH may be a 1st PDSCH after SPS configuration activation; or the first PDSCH may be scheduled by a PDCCH; or the first PDSCH may be an SPS PDSCH corresponding to no PDCCH.

In some embodiments, the transceiver 1501 is further configured to: refrain from receiving third HARQ-ACK feedback information corresponding to the second PDSCH, when the network device sends, to the terminal device within the second time range, the second PDSCH scheduled for the first HARQ process; or the transceiver 1501 is further configured to: refrain from receiving third HARQ-ACK feedback information corresponding to the second PDSCH, when the network device sends the first PDCCH to the terminal device within the second time range.

In some embodiments, the second PDSCH may be scheduled by a PDCCH, or the second PDSCH may be an SPS PDSCH corresponding to no PDCCH.

In some embodiments, the transceiver 1501 is further configured to: send a third PDSCH scheduled for the second HARQ process, in a case that the second HARQ process is configured with enabled HARQ-ACK feedback. The third PDSCH is an SPS PDSCH corresponding to no PDCCH.

The transceiver 1501 is further configured to: from end of sending of the third PDSCH to end of transmission to the network device from the terminal device of second HARQ-ACK feedback information corresponding to the third PDSCH, not expect to send a fourth PDSCH scheduled for the second HARQ process, or not expect to send a second PDCCH to the terminal device. The second PDCCH is used for the network device to schedule the fourth PDSCH for the second HARQ process.

In some embodiments, the transceiver 1501 is further configured to: send a third PDSCH scheduled for the second HARQ process, in a case that the second HARQ process is configured with disabled HARQ-ACK feedback. The third PDSCH is an SPS PDSCH corresponding to no PDCCH.

The transceiver 1501 is further configured to: from end of sending of the third PDSCH to end of a second duration, not expect to send a fourth PDSCH scheduled for the second HARQ process, or not expect to send a second PDCCH to the terminal device. The second PDCCH is used for the network device to schedule the fourth PDSCH for the second HARQ process.

Those skilled in the art should understand that relevant description of the above apparatus for communication according to the embodiments of the disclosure can be understood with reference to the relevant description of the method for communication according to the embodiments of the disclosure.

Figure 16:
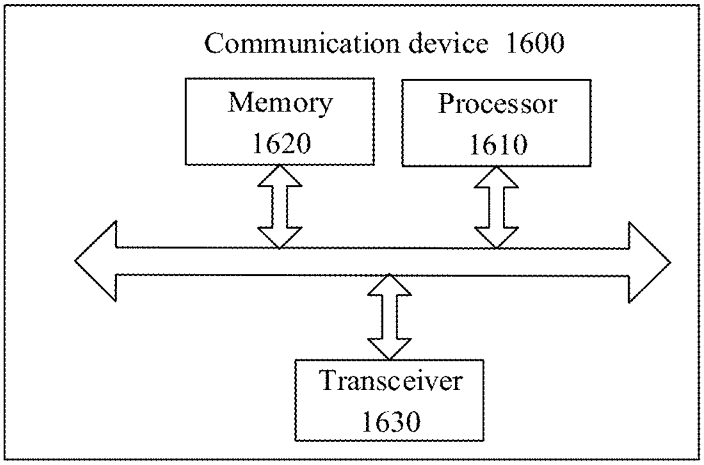
FIG. 16 illustrates a schematic structural diagram of a communication device according to embodiments of the disclosure.

FIG. 16 illustrates a schematic structural diagram of a communication device according to embodiments of the disclosure. The communication device may be a terminal device, or may be a network device. The communication device 1600 illustrated in FIG. 16 includes a processor 1610 and a memory 1620. The memory 1620 is configured to store a computer program, and the processor 1610 is configured to call and run the computer program stored in the memory 1620 to perform the method for communication of any above embodiment, for example, to perform the method for communication performed by a terminal device in any above embodiment or to perform the method for communication performed by a network device in any above embodiment.

The memory 1620 may be a device independent from the processor 1610, or may be integrated in the processor 1610.

In some embodiments, as illustrated in FIG. 16, the communication device 1600 may further include a transceiver 1630. The processor 1610 may control the transceiver 1630 to communication with other devices, in particular to send information or data to other devices or receive information or data from other device. The transceiver 1630 may include a transmitter and a receiver. The transceiver 1630 may further include an antenna, and there may be one or more antennas.

In some embodiments, the communication device 1600 may particularly be the network device of the embodiments of the disclosure, and the communication device 1600 may implement corresponding procedures that are implemented by the network device in various methods according to the embodiments of the disclosure, which is not described here again for simplicity.

In some embodiments, the communication device 1600 may particularly be a terminal device according to the embodiments of the disclosure, and the communication device 1600 may implement corresponding procedures that are implemented by the terminal device in various methods according to the embodiments of the disclosure, which is not described here again for simplicity.

Figure 17:
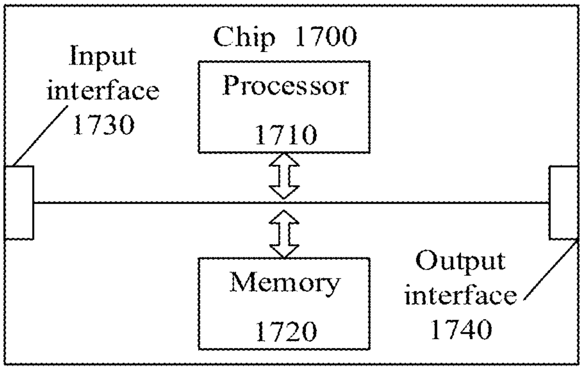
FIG. 17 illustrates a schematic structural diagram of a chip according to embodiments of the disclosure.

FIG. 17 illustrates a schematic structural diagram of a chip according to embodiments of the disclosure. The chip 1700 as illustrated in FIG. 17 includes a processor 1710. The processor 1710 may call and run a computer program from a memory 1720 to enable a terminal device or network device installed with the chip 1700 to implement the method for communication performed by a terminal device or by a network device in any above embodiment.

In some embodiments, as illustrated in FIG. 17, the chip 1700 may further include a memory 1720. The processor 1710 may call and run a computer program from the memory 1720 to implement the method according to the embodiments of the disclosure.

The memory 1720 may be a device independent from the processor 1710, or may be integrated in the processor 1710.

In some embodiments, the chip 1700 may further include an input interface 1730. The processor 1710 may control the input interface 1730 to communicate with other devices or chips, in particularly to acquire information or data sent by other devices or chips.

In some embodiments, the chip 1700 may further include an output interface 1740. The processor 1710 may control the output interface 1740 to communicate with other devices or chips, in particularly to output information or data to other devices or chips.

In some embodiments, the chip may be applied to the network device of the embodiments of the disclosure, and the chip may implement corresponding procedures that are implemented by the network device in various methods according to the embodiments of the disclosure, which is not described here again for simplicity.

In some embodiments, the chip may be applied to a terminal device according to the embodiments of the disclosure, and the chip may implement corresponding procedures that are implemented by the terminal device in various methods according to the embodiments of the disclosure, which is not described here again for simplicity.

It should be understood that, the chip mentioned in the embodiments of the disclosure may also be referred to as a system-level chip, a system chip, a chip system or a system-on-chip.

Embodiments of the disclosure further provide a computer storage medium for storing a computer program that enables a terminal device to perform the method for communication performed by a terminal device in any above embodiment, or a computer program that enables a network device to perform the method for communication performed by a network device in any above embodiment.

In some embodiments, the computer storage medium may be applied to the network device of the embodiments of the disclosure, and the computer program enables the network device to implement corresponding procedures that are implemented by the network device in various methods according to the embodiments of the disclosure, which is not described here again for simplicity.

In some embodiments, the computer storage medium may be applied to a terminal device according to the embodiments of the disclosure, and the computer program enables the terminal device to implement corresponding procedures that are implemented by the terminal device in various methods according to the embodiments of the disclosure, which is not described here again for simplicity.

Embodiments of the disclosure further provide a computer program product containing computer program instructions that enable a terminal device to perform the method for communication performed by a terminal device in any above embodiment, or computer program instructions that enable a network device to perform the method for communication performed by the network device in any above embodiment.

In some embodiments, the computer program product may be applied to the network device of the embodiments of the disclosure, and instructions of the computer program product enable a computer to implement corresponding procedures that are implemented by the network device in various methods according to the embodiments of the disclosure, which is not described here again for simplicity.

In some embodiments, the computer program product may be applied to a terminal device according to the embodiments of the disclosure, and instructions of the computer program product enable a computer to implement corresponding procedures that are implemented by the terminal device in various methods according to the embodiments of the disclosure, which is not described here again for simplicity.

Embodiments of the disclosure further provide a computer program that enables a terminal device to perform the method for communication performed by the terminal device in any above embodiment, or a computer program that enables a network device to perform the method for communication performed by the network device in any above embodiment.

In some embodiments, the computer program may be applied to the network device of the embodiments of the disclosure, and the computer program, when running on a computer, enables the computer to implement corresponding procedures that are implemented by the network device in various methods according to the embodiments of the disclosure, which is not described here again for simplicity.

In some embodiments, the computer program may be applied to a terminal device according to the embodiments of the disclosure, and the computer program, when running on a computer, enables the computer to implement corresponding procedures that are implemented by the terminal device in various methods according to the embodiments of the disclosure, which is not described here again for simplicity.

The processor, apparatus for communication or chip of the embodiments of the disclosure may be an integrated circuit chip, and has the capability of signal processing. During implementation, the various steps of in the above method embodiment may be completed by an integrated logic circuit in hardware form or instructions in software form in a processor, apparatus for communication or chip. The above processor, apparatus for communication or chip may include an integration of one or more of following: a general-purpose processor, an application specific integrated circuit (ASIC), a digital signal processor (DSP), a digital signal processing device (DSPD), a programmable logic device (PLD), a field programmable gate array (FPGA), a central processing unit (CPU), a graphics processing unit (GPU), a neural-network processing units (NPU), a controller, a micro-controller, a microprocessor, a programmable logical device, a discrete gate or a transistor logical device, or a discrete hardware component. The processor may implement or perform the various methods, steps or logic blocks disclosed in the embodiments of the disclosure. The universal processor may be a microprocessor or the processor may also be any conventional processor and the like. The steps of the methods disclosed in combination with the embodiments of the disclosure may be directly embodied as being performed and completed by a hardware decoding processor, or being performed and completed by a combination of hardware and software modules in a decoding processor. The software module may be located in a mature storage medium in the art such as a random access memory, a flash memory, a read-only memory, a programmable read-only memory, an electrically erasable programmable, or a register. The storage medium is in a memory, and a processor reads information from the memory to implement steps of the above methods in combination with the hardware.

It may be understood that the memory or computer-storage medium in the embodiments of the disclosure may be a volatile memory or a non-volatile memory, or may include both a volatile memory and a non-volatile memory. The non-volatile memory may be a read-only memory (ROM), a programmable ROM (PROM), an erasable PROM (RPROM), an electrically RPROM (EEPROM), or a flash memory. The volatile memory may be a random access memory (RAM), that is used as an external cache. By way of example, but not limiting description, RAMs in many forms are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a directly rambus RAM (DR RAM). It should be noted that, the memory in the system and method described herein is intended to include but not limited to memories of these and any other suitable types.

It should be understood that the memories or computer-readable storage mediums are exemplary but not limiting description. For example, the memory in the embodiments of the disclosure may also be a static RAM (SRAM), a dynamic RAM (DRAM), a synchronous DRAM (SDRAM), a double data rate SDRAM (SSD SDRAM), an enhanced SDRAM (ESDRAM), a synch link DRAM (SLDRAM), or a direct Rambus RAM (DR RAM). That is to say, the memory in the embodiments of the disclosure is intended to include but not limited to memories of these and any other suitable types.

Those of ordinary skill in the art may realize that the units and algorithm steps of various examples described in combination with the embodiments disclosed herein may be implemented by electronic hardware, or a combination of computer software and electronic hardware. Whether the functions are performed in form of hardware or software form depends on the specific application and design constraint conditions of the technical solution. Professionals may use a different method to realize the described function for each specific application, and such implementation should not be construed as extending beyond the scope of the disclosure Those skilled in the art may clearly appreciate that for convenience and simplicity of description, the particular operation procedures of the system, apparatus and units described above may refer to corresponding procedures in the foregoing method embodiment, which will not be described herein again.

In some embodiments provided in the disclosure, it is to be understood that the disclosed system, device and method may be implemented in other ways. For example, the device embodiment described above is only exemplary, and for example, division of the units is only division in logic functions, and division may be made in other ways during practical implementation. For example, multiple units or components may be combined or integrated into another system, or some features may be neglected or not executed. In addition, coupling or direct coupling or communication connection between various displayed or discussed components may be indirect coupling or communication connection, implemented through some interfaces, devices or units, and may be electrical and mechanical or in other forms.

The units described as separate components may or may not be physically discrete from one another. Components displayed as units may or may not be physical units, and can be located at the same place or may be distributed to multiple network units. Some or all of the units may be chosen to realize the purpose of the solution of the embodiments according to actual requirements.

Additionally, various functional units in the embodiments of the disclosure may be integrated in one processing unit, or may exist separately physically; or two or more units may be integrated in one unit.

If implemented in form of software functional units and sold or used as independent product, the functions may be stored in a computer-readable storage medium. Based on such understanding, the technical solution of the disclosure substantially or in part making contributions to the related art or a part of the technical solution may be embodied in a software product. The computer software product is stored in a storage medium, and includes several instructions to enable a computer device (which may be a personal computer, a server, a network device or the like) to perform all or some steps of the method according to various embodiments of the disclosure. The foregoing storage medium includes various media capable of storage program codes such as a USB flash drive, a mobile hard disk drive, a read-only memory (ROM), a random access memory (RAM), a magnetic disc, or a compact disc (CD).

Stated above is merely detailed description of the disclosure, but the scope of protection of the disclosure is not limited thereto. Any modification or replacement that is easily conceivable by those familiar with the related art within the technical range disclosed by the disclosure shall fall within the scope of protection of the disclosure. Therefore, the scope of protection of the disclosure should be subjected to the claimed scope of the claims.

The invention claimed is:

1. A method for communication, comprising:

receiving, by a terminal device, a first physical downlink shared channel (PDSCH) scheduled for a first hybrid automatic repeat request (HARQ) process from a network device; and within a first time range, not expecting to receive, by the terminal device, a second PDSCH scheduled for the first HARQ process from the network device, or not expecting to receive, by the terminal device, a first physical downlink control channel (PDCCH), wherein the first PDCCH is used for the network device to schedule the second PDSCH for the first HARQ process, wherein the terminal device is configured to enable HARQ acknowledgement (HARQ-ACK) feedback corresponding to semi-persistent scheduling (SPS) configuration activation, and the first HARQ process is configured with enabled HARQ-ACK feedback; or the terminal device is configured to enable HARQ-ACK feedback corresponding to SPS configuration activation, and the first HARQ process is configured with disabled HARQ-ACK feedback; or the terminal device is not configured to enable HARQ-ACK feedback corresponding to SPS configuration activation, and the first HARQ process is configured with enabled HARQ-ACK feedback.

2. The method of claim 1, wherein the first time range starts at end of reception of the first PDSCH; or, the first time range ends at end of transmission, from the terminal device to the network device, of first HARQ acknowledgement (HARQ-ACK) feedback information corresponding to the first PDSCH; or, the first time range starts at end of reception of the first PDSCH, and ends at end of transmission, from the terminal device to the network device, of first HARQ acknowledgement (HARQ-ACK) feedback information corresponding to the first PDSCH.

3. The method of claim 2, wherein a time sequence for the transmission of the first HARQ-ACK feedback information from the terminal device to the network device is determined according to at least one of following: a set of HARQ feedback time sequences, an offset value Koffset, or an HARQ feedback timing value K1.

4. The method of claim 2, wherein in case that the terminal device is configured with enabled HARQ-ACK feedback corresponding to SPS configuration activation and the first HARQ process corresponds to enabled HARQ-ACK feedback, the first time range starts at the end of the reception of the first PDSCH, and ends at the end of the transmission, from the terminal device to the network device, of first HARQ-ACK feedback information corresponding to the first PDSCH.

5. The method of claim 1, wherein the first PDSCH is a $1^{st}$ PDSCH after SPS configuration activation; or the first PDSCH is scheduled by a PDCCH; or the first PDSCH is an SPS PDSCH corresponding to no PDCCH.

6. A method for communication, comprising:

sending, by a network device to a terminal device, a first physical downlink shared channel (PDSCH) scheduled for a first hybrid automatic repeat request (HARQ) process; and within a second time range, not expecting, by the network device, to send a second PDSCH scheduled for the first HARQ process to the terminal device, or not expecting to send a first physical downlink control channel (PDCCH) to the terminal device, wherein the first PDCCH is used for the network device to schedule the second PDSCH for the first HARQ process, wherein the network device configures the terminal device to enable HARQ acknowledgement (HARQ-ACK) feedback corresponding to semi-persistent scheduling (SPS) configuration activation, and the first HARQ process is configured with enabled HARQ-ACK feedback; or the network device configures the terminal device to enable HARQ-ACK feedback corresponding to SPS configuration activation, and the first HARQ process is configured with disabled HARQ-ACK feedback; or the network device does not configure the terminal device to enable HARQ-ACK feedback corresponding to SPS configuration activation, and the first HARQ process is configured with enabled HARQ-ACK feedback.

7. The method of claim 6, wherein the second time range starts at end of transmission of the first PDSCH; or, the second time range ends at end of transmission, from the terminal device to the network device, of first HARQ acknowledgement (HARQ-ACK) feedback information corresponding to the first PDSCH; or, the second time range starts at end of transmission of the first PDSCH, and ends at end of transmission, from the terminal device to the network device, of first HARQ acknowledgement (HARQ-ACK) feedback information corresponding to the first PDSCH.

8. The method of claim 7, wherein a time sequence for the transmission of the first HARQ-ACK feedback information from the terminal device to the network device is determined according to at least one of following: a set of HARQ feedback time sequences, an offset value Koffset, or an HARQ feedback timing value K1.

9. The method of claim 7, wherein in case that the network device configures the terminal device to enable HARQ-ACK feedback corresponding to SPS configuration activation and the first HARQ process corresponds to enabled HARQ-ACK feedback, the second time range starts at the end of the reception of the first PDSCH, and ends at the end of the transmission, from the terminal device to the network device, of first HARQ-ACK feedback information corresponding to the first PDSCH.

10. The method of claim 6, wherein the first PDSCH is a $1^{st}$ PDSCH after SPS configuration activation; or the first PDSCH is scheduled by a PDCCH; or the first PDSCH is an SPS PDSCH corresponding to no PDCCH.

11. An apparatus for communication, comprising:

a transceiver; and a processor, configured to control the transceiver to implement the method of claim 6, wherein the apparatus configures the terminal device to enable HARQ acknowledgement (HARQ-ACK) feedback corresponding to semi-persistent scheduling (SPS) configuration activation, and the first HARQ process is configured with enabled HARQ-ACK feedback; or the apparatus configures the terminal device to enable HARQ-ACK feedback corresponding to SPS configuration activation, and the first HARQ process is configured with disabled HARQ-ACK feedback; or the apparatus does not configure the terminal device to enable HARQ-ACK feedback corresponding to SPS configuration activation, and the first HARQ process is configured with enabled HARQ-ACK feedback.

12. The apparatus of claim 11, wherein the second time range starts at end of transmission of the first PDSCH; or, the second time range ends at end of transmission, from the terminal device to the network device, of first HARQ acknowledgement (HARQ-ACK) feedback information corresponding to the first PDSCH; or, the second time range starts at end of transmission of the first PDSCH, and ends at end of transmission, from the terminal device to the network device, of first HARQ acknowledgement (HARQ-ACK) feedback information corresponding to the first PDSCH.

13. The apparatus of claim 12, wherein a time sequence for the transmission of the first HARQ-ACK feedback information from the terminal device to the network device is determined according to at least one of following: a set of HARQ feedback time sequences, an offset value Koffset, or an HARQ feedback timing value K1.

14. An apparatus for communication, comprising:

a transceiver, configured to:

receive a first physical downlink shared channel (PDSCH) scheduled for a first hybrid automatic repeat request (HARQ) process from a network device; and within a first time range, not expect to receive a second PDSCH scheduled for the first HARQ process from the network device, or not expect to receive a first physical downlink control channel (PDCCH), wherein the first PDCCH is used for the network device to schedule the second PDSCH for the first HARQ process, wherein the apparatus is configured to enable HARQ acknowledgement (HARQ-ACK) feedback corresponding to semi-persistent scheduling (SPS) configuration activation, and the first HARQ process is configured with enabled HARQ-ACK feedback; or the apparatus is configured to enable HARQ-ACK feedback corresponding to SPS configuration activation, and the first HARQ process is configured with disabled HARQ-ACK feedback; or the apparatus is not configured to enable HARQ-ACK feedback corresponding to SPS configuration activation, and the first HARQ process is configured with enabled HARQ-ACK feedback.

15. The apparatus of claim 14, wherein the first time range starts at end of reception of the first PDSCH; or, the first time range ends at end of transmission, from the terminal device to the network device, of first HARQ acknowledgement (HARQ-ACK) feedback information corresponding to the first PDSCH; or, the first time range starts at end of reception of the first PDSCH, and ends at end of transmission, from the terminal device to the network device, of first HARQ acknowledgement (HARQ-ACK) feedback information corresponding to the first PDSCH.

16. The apparatus of claim 15, wherein a time sequence for the transmission of the first HARQ-ACK feedback information from the terminal device to the network device is determined according to at least one of following: a set of HARQ feedback time sequences, an offset value Koffset, or an HARQ feedback timing value K1.

* * * * *